(12) United States Patent
Lahouij et al.

(10) Patent No.: US 10,647,938 B2
(45) Date of Patent: May 12, 2020

(54) NANO-ADDITIVES ENABLED ADVANCED LUBRICANTS

(71) Applicants: PIXELLIGENT TECHNOLOGIES LLC, Baltimore, MD (US); UCHICAGO ARGONNE, LLC, Chicago, IL (US); THE TRUSTEES OF THE UNIVERSITY OF PENNSYLVANIA, Philadelphia, PA (US)

(72) Inventors: Imene Lahouij, Philadelphia, PA (US); Robert Carpick, Philadelphia, PA (US); Andrew Jackson, Baltimore, MD (US); Harman Khare, Philadelphia, PA (US); Nitya Gosvami, Philadelphia, PA (US); Nicholaos G. Demas, Chicago, IL (US); Robert A. Erck, Chicago, IL (US); Aaron C. Greco, Chicago, IL (US); George R. Fenske, Chicago, IL (US); Wei Xu, Baltimore, MD (US); Gregory Cooper, Baltimore, MD (US); Zhiyun Chen, Baltimore, MD (US)

(73) Assignees: PIXELLIGENT TECHNOLOGIES, LLC, Baltimore, MD (US); UCHICAGO ARGONNE, LLC, Chicago, IL (US); THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 0 days.

(21) Appl. No.: 15/569,271

(22) PCT Filed: May 4, 2016

(86) PCT No.: PCT/US2016/030678
§ 371 (c)(1),
(2) Date: Oct. 25, 2017

(87) PCT Pub. No.: WO2016/179224
PCT Pub. Date: Nov. 10, 2016

(65) Prior Publication Data
US 2018/0127676 A1   May 10, 2018

Related U.S. Application Data

(60) Provisional application No. 62/156,400, filed on May 4, 2015, provisional application No. 62/163,116, filed
(Continued)

(51) Int. Cl.
*F16C 33/04* (2006.01)
*C10M 141/10* (2006.01)
(Continued)

(52) U.S. Cl.
CPC .......... *C10M 125/10* (2013.01); *B82Y 40/00* (2013.01); *C10M 141/10* (2013.01);
(Continued)

(58) Field of Classification Search
CPC ........................ C10M 125/10; C10M 2201/05
(Continued)

(56) References Cited

U.S. PATENT DOCUMENTS 7,431,989 B2   10/2008   Sakhrani et al.
7,553,529 B2   6/2009   Sakhrani et al.
(Continued)

OTHER PUBLICATIONS

International Search Report for PCT/US2016/030678, dated Aug. 12, 2016, 3 pages.
(Continued)

*Primary Examiner* — Prem C Singh
*Assistant Examiner* — Francis C Campanell
(74) *Attorney, Agent, or Firm* — Nixon & Vanderhye P.C.

(57) ABSTRACT

The presently disclosed technology relates to a nano-additives to improve the performance of lubricants, oils, and greases. More specifically, the presently disclosed technology relates to applying capped metal oxide nanoparticles, such as capped zirconia nanoparticles, in the lubricants to produce a tribofilms on the lubricating surfaces to provide wear protection to the said surfaces. Also, the interaction of the capped zirconia nanoparticles with other commonly used additives in lubricants may further optimize the performance of the resulting tribofilms.

19 Claims, 23 Drawing Sheets

Related U.S. Application Data on May 18, 2015, provisional application No. 62/163,126, filed on May 18, 2015.

(51) Int. Cl.
  *C10M 125/10* (2006.01)
  *B82Y 40/00* (2011.01)
  *C10M 171/06* (2006.01)
  *B82Y 30/00* (2011.01)

(52) U.S. Cl.
  CPC ............ *C10M 171/06* (2013.01); *B82Y 30/00* (2013.01); *C10M 2201/14* (2013.01); *C10M 2203/1006* (2013.01); *C10M 2205/00* (2013.01); *C10M 2205/0285* (2013.01); *C10M 2207/2805* (2013.01); *C10M 2209/1033* (2013.01); *C10M 2223/045* (2013.01); *C10M 2229/025* (2013.01); *C10N 2210/04* (2013.01); *C10N 2220/082* (2013.01); *C10N 2220/084* (2013.01); *C10N 2230/58* (2013.01); *C10N 2240/02* (2013.01); *C10N 2240/04* (2013.01); *C10N 2240/10* (2013.01); *C10N 2250/10* (2013.01); *C10N 2250/121* (2013.01)

(58) Field of Classification Search
  USPC .................................................. 508/162, 108
  See application file for complete search history.

(56) References Cited

U.S. PATENT DOCUMENTS

| | | |
|---|---|---|
| 7,674,504 B2 | 3/2010 | Sakhrani et al. |
| 8,410,029 B2 | 4/2013 | Miyasaka |
| 8,883,903 B2 | 11/2014 | Gonen Williams et al. |
| 8,920,675 B2 | 12/2014 | Xu et al. |
| 9,109,183 B2 | 8/2015 | Carli |
| 9,202,688 B2 | 12/2015 | Gonen Williams et al. |
| 9,284,508 B2 | 3/2016 | Baran, Jr. et al. |
| 9,328,432 B2 | 5/2016 | Gonen Williams et al. |
| 2004/0231926 A1 | 11/2004 | Sakhrani et al. |
| 2008/0145565 A1 | 6/2008 | Sakhrani et al. |
| 2008/0254304 A1 | 10/2008 | Sakhrani et al. |
| 2008/0287326 A1* | 11/2008 | Zhang ................. C10M 103/02 508/113 |
| 2009/0312206 A1 | 12/2009 | Miyasaka |
| 2011/0257054 A1 | 10/2011 | Baron, Jr. et al. |
| 2013/0206353 A1 | 8/2013 | Carli |
| 2014/0005085 A1* | 1/2014 | Malshe ................ C10M 141/00 508/113 |
| 2014/0045323 A1* | 2/2014 | Gonen Williams .... B82Y 30/00 438/478 |
| 2014/0100145 A1 | 4/2014 | Baran, Jr. et al. |
| 2015/0080277 A1 | 3/2015 | Koshima et al. |

OTHER PUBLICATIONS

Written Opinion of the ISA for PCT/US2016/030678, dated Aug. 12, 2016, 10 pages.
Comfort, AS, et al. TARDEC, "Investigations into Tribofilm Formation and Removal of Zirconia Nanoparticle and Oil Dispersions", presented at Jan. 25, 2017 meeting of the Detroit branch of the Society for Tribology and Lubrication Engineers, Detroit, MI, 55 pages.
H. Spikes, "Low-and-zero-sulphated ash, phosphorous and sulphur anti-wear additives for engine oils", Lubr. Sci. 20 (2008), pp. 103-136.
J. Tannous et al., "Understanding the tribochemical mechanism of IF-MoS2 nanoparticles under boundary lubrication", Tribol. Lett. 41 (2011), pp. 55-64.
A. Hernandez Batterz et al., "CuO, ZrO$_2$ and ZnO nanoparticles an antiwear additives in oil lubricants", Wear 265 (2008), pp. 422-428.
H. Kato and K. Komai, "Tribofilm formation and mild wear by tribo-sintering of nanometer-sized oxide particles on rubbing steel surfaces", Wear 262 (2007), pp. 36-41.

\* cited by examiner

FIG. 8A  FIG. 8B

| Element | Top layer | Down layer |
|---|---|---|
| C K | 21 | 11.3 |
| O K | 33.8 | 32.5 |
| Zr K | 10.7 | 9.4 |
| P K | 1.1 | 1.7 |
| S K | 0.3 | 0.3 |
| Zn K | 0.7 | 1 |
| Cr K | 0.5 | 0.5 |
| Fe K | 4.4 | 16.9 |
| Si K | 0 | 0 |
| Ga K | 1.3 | 0.6 |
| Pt L | 4 | 1 |
| Cu K | 22 | 24.8 |

NANO-ADDITIVES ENABLED ADVANCED LUBRICANTS

This application is the U.S. national phase of International Application No. PCT/US2016/030678 filed May 4, 2016, which designated the U.S. and claims benefit of U.S. Provisional Application Nos. 62/156,400, 62/163,116, 62/163,126, filed May 4, 2015, May 18, 2015 and May 18, 2015, respectively, the entire contents of each of which are hereby incorporated herein by reference.

STATEMENT REGARDING FEDERALLY SPONSORED RESEARCH OR DEVELOPMENT

This application is partially supported by a U.S. Dept. of Energy Corporate Research and Development Agreement (CRADA) No. 1200801 and U.S. Dept. of Energy Small Business Innovation Research (SBIR) Phase I and II Grants No. DE-SC0009222.

This presently disclosed technology pertains, among other things, to a lubricant containing nano-additives for oils and greases. The present disclosure provides a zirconia nanoparticles dispersion in oils with or without other additives. The function of these nano-additives are to form a protective tribofilm on contacting surfaces. The tribofilm may supplement the boundary and fluid film formed by the lubricant to provide wear and/or friction reduction and thus enable the use of lubricants with lower viscosity.

Lubricating oils and greases are commonly used in a variety of applications, for example: crankcase lubricants for internal combustion engines, lubricating oils for geared transmissions in vehicles and wind turbine drivetrains, and grease or oil lubricants for rolling element bearings. The lubricant provides protection against, among other damage including corrosion, wear of the contacting surfaces through a pressurized fluid film and/or the formation of a solid tribofilm generated during operation. While a fluid film is governed by the viscosity of the oil, the tribofilm formation is typically provided by chemical additives that react to form a solid film on the surface. In efforts to improve efficiency of mechanical drives there is a trend to reduce the viscosity of the lubricating oils to lower the churning or viscous loses. To maintain the durability of components, the performance requirements of the lubricant additives are more demanding, specifically for friction and wear.

The chemical additives traditionally used in lubricants to provide protective tribofilms are referred to as Anti-Wear (AW) and Extreme Pressure (EP) additives. Furthermore Friction Modifiers (FM) are used to maintain a low shear surface at the contact. These additives come in a variety of forms but most are organometallic compounds containing phosphorus, sulfur, and zinc. These compounds chemically react with the contacting surfaces to form an amorphous and/or crystalline solid tribofilm. While the mechanisms responsible for tribofilm formation from organometallics is still a topic of ongoing research, in practice it is generally observed that a certain level of shear, pressure, and/or temperature is required to nucleate and grow a tribofilm with organometallic compounds. Furthermore, in automotive applications, the phosphorus and sulfur content of these additives have been shown to have a detrimental impact on the exhaust after treatment catalysts; this has led to tighter restrictions on allowable content of these compounds in the lubricant.

The use of nanoparticles as an additive to lubricants to provide AW, EP, and FM performance qualities presents an innovative approach to supplement or replace the use of organometallic compounds or other additive chemistries. The mechanisms governing the formation of a tribofilm from nanoparticles are fundamentally different than those of the chemical additives, which presents potential advantages in certain contact configurations. Therefore, inorganic nanoparticles, particles less than 100 nm in diameter, have recently been a subject of interest as friction modifier or anti-wear agent for lubricants. There have been many studies on the subject (H. Spikes, Lubr. Sci. 20 (2008), pp. 103-136; J. Tannous et al., Tribol. Lett. 41 (2011), pp 55-64; A. Hernandez Batterz et al., Wear 265 (2008), pp. 422-428; H. Kato and K. Komai, Wear 262 (2007), pp 36-41). These studies, however, all suffer from (1) the lack of control on the quality of nanoparticles, i.e. the size and size distribution, and (2) lack of dispersion stability in the oils. The results, therefore, were not conclusive regarding the benefit the nanoparticle additives provided. It is now understood that to enable the advantages provided by nanoparticle additives and to avoid any detrimental consequences, the nanoparticles have to meet certain considerations include: dispersion and suspension, stability at elevated temperature, compatibility and synergy with other lubricant additives, and interaction compatibility with contacting surfaces.

In the past few years, Pixelligent has developed a family of inorganic nanoparticles and nanocrystals which have small size (typically smaller than 10 nm diameter), with a narrow size distribution, and most importantly, an engineered surface chemistry so that they can be dispersed into common base stocks without observable impact on the appearance, viscosity, and shelf-life of the oils. Nanoparticles will be understood to include nanocrystals. Because Pixelligent's nanoparticles are much smaller than typical asperities of almost all practical manufactured surfaces in tribological applications, and also because of the quality and stability of the dispersion, true nano-scale control of the tribological behavior has been observed, and the benefits of the nanoparticle additives can be leveraged for reducing friction and wear.

This presently disclosed technology provides, among other things, that a zirconia nanoparticle dispersion in oils with or without other additives forms a protective tribofilm that is self-limiting and self-regenerating in rolling, sliding, or rolling-sliding contact. This is achieved through well-dispersed, capped nanoparticles to maintain a stable, homogeneous distribution and avoiding agglomeration of particles. The nano-scale size of the particle, 4-20 nm, is critical in enabling the additive to enter the contact while avoiding any unintended detrimental effects. If the nanoparticles are not capped or dispersed attractive forces bring the particles together causing agglomeration and leading to fall-out of suspension. The agglomerations lead to a non-uniform mixture in the oil and if the agglomeration is large and hard enough can lead to abrasion of the contacting surface resulting in increased wear.

In addition to having a well dispersed nanoparticle that enters the contact, this presently disclosed technology provides a nanoparticle that, once in contact, adheres strongly to the component surface and grows a thick tribofilm (30 nm to 500 nm). The nucleation of this tribofilm occurs in sliding, rolling, or rolling-sliding contacts, and at temperature ranges of −50° C. to 160° C. and beyond, thus extending the conditions that traditional AW and EP additives form tribofilms.

The present disclosure provides nano-additives for lubricants, oils, and greases. During operation, the said nano-additive may build protective, self-limiting, self-regenerating tribofilms in rolling, sliding, or rolling-sliding contacts.

Such a tribofilm may reduce wear and/or friction at the lubricating contacts. Such a tribofilm may supplement the boundary, mixed, elasto-hydrodynamic (EHL) and/or hydrodynamic film formed by the lubricant thus allowing lubricant viscosity reduction.

The presently disclosed lubricants, oils, and greases may include any mineral and synthetic oils including synthetic hydrocarbons, esters, polyglycols, silicones, and ionic liquids.

The present disclosure provides a zirconia nanoparticle dispersion, in pure oils or oils with other lubricant additives comprising anti-wear (AW) additives such as zinc dialkyldithiophosphates (ZDDP), or friction modifiers (FM), anti-oxidants, extreme pressure (EP) additives, anti-foams, detergents, dispersants, pour point depressants, or any other commonly used lubricant additives.

The presently disclosed zirconia nanoparticles may be capped with surface capping agents as previously described in any of U.S. Pat. Nos. 8,883,903; 9,328,432; 9,202,688 and 8,920,675, the entire contents of each of which are incorporated herein by reference.

The presently disclosed zirconia nanoparticles may have size smaller than 20 nm, or smaller than 15 nm, or smaller than 10 nm, or smaller than 5 nm.

The presently disclosed zirconia nanoparticle dispersion may demonstrate higher clarity. Said dispersion with 10 wt % capped zirconia nanoparticles, when measured in a cuvette with 10 mm optical path, demonstrates optical transmittance higher that 50%, or higher than 60%, or higher than 70%, or higher than 80%, or higher than 90%, or higher than 95%, or higher than 99%.

The presently disclosed zirconia nanoparticle dispersion may demonstrate high stability. Said dispersion with 10 wt % capped zirconia nanoparticles, when measured in a cuvette with 10 mm optical path, demonstrates change in optical transmittance less than 10%, or less than 5%, or less than 1%, after 1 month storage, or after 3 month storage, or after 6 month storage, or after 1 year storage, or after 2 year storage, or after 3 year storage.

The presently disclosed zirconia nanoparticles may form a tribofilm on tribologically contacting surfaces in relative motion and under tribological stress. Said tribofilm may be highly dense and polycrystalline. Said tribofilm may have thickness in the range of 30 nm to 500 nm. Said tribofilm may have a hardness less than or equal to 7.3 GPa, and modulus less than or equal to about 160 GPa when measured with nano-indentation.

The small size and superb dispersibility of the nanoparticles enable them to enter the space separating asperities on the surfaces in a tribological contact. The mechanism of the tribofilm formation may be that under tribological stress, the capping agents on the nanoparticle surface are removed, the nanoparticles are bonded to the rubbing surfaces to form nucleation sites, the nanoparticles coalesce onto the nucleation sites, and then undergo grain coarsening to form an integral tribofilm. The tribofilm growth is stress driven and higher stress leads to faster nucleation and tribofilm growth process.

The presently disclosed tribofilm may demonstrate self-limiting thickness during its formation under a given tribological condition. The maximum film thickness may be 30 nm-50 nm, or 50 nm-100 nm, or 100 nm-200 nm, or 200 nm-300 nm, or 300 nm-400 nm, or 400 nm-500 nm, or 500 nm or larger.

The presently disclosed tribofilm may have surface RMS roughness equal to or less than 2 nm, or 2 nm-5 nm, or 5 nm-10 nm, or 10 nm-50 nm, or 50 nm-100 nm, or 100 nm-500 nm.

The presently disclosed tribofilm has carbon content of 10%-15%, or 5%-10%, or less than 5%, as measured by EDX, EELS, or FTIR.

The presently disclosed tribofilm may have high adhesion to the substrates as measured the by tape test.

The presently disclosed tribofilm may not be removed by acid such as 10% hydrochloric acid solution, or base, such as 10% tetramethylammonium hydroxide (TMAH) solution.

The presently disclosed tribofilm may form under pure sliding, pure rolling, or mixed rolling-sliding conditions.

The presently disclosed tribofilm may form in the temperature range of −50 C to 160 C, or 0 C to 160 C, or 20 C to 130 C.

The presently disclosed tribofilm may form on a steel surface, or a silicon surface, an amorphous carbon surface or a ceramic such as yttria-stabilized zirconia surface.

The presently disclosed tribofilm may form on surfaces with RMS surface roughness larger than 5 nm.

The presently disclosed tribofilm may form with an oil with 10 wt % capped ZrO2 nanoparticles, or 1 wt % capped ZrO2 nanoparticles, or 0.1 wt % capped ZrO2 nanoparticles, or 0.01 wt % capped ZrO2 nanoparticles.

The presently disclosed tribofilm may form under tribological contact 10 nm or wider, or 1 um or wider, or 150 um or wider, or 1 mm or wider.

The presently disclosed tribofilm may be formed in the presence of ZrO2 nanoparticles together with anti-wear (AW) additives such as zinc dialkyldithiophosphates (ZDDP), or friction modifiers (FM), anti-oxidants, extreme pressure (EP) additives, anti-foams, detergent, dispersants, pour point depressants, or any other commonly used lubricant additives.

The presently disclosed technology provides a method of forming a solid film on a lubricated surface that includes placing a lubricant in a contact region defined by two surfaces in proximity, sliding and/or rolling said surfaces so as to produce a pressure and/or shear stress on the lubricated surface in the contact region, and thereby forming the solid film in the contact region, wherein the solid film is adhered to at least one of the surfaces in the contact region, the lubricant containing at least partially capped, metal oxide nanocrystals.

Metal oxide nanocrystals of the presently disclosed technology include zinc oxide, hafnium oxide, zirconium oxide, hafnium-zirconium oxide, titanium-zirconium oxide and/or yttrium oxide.

Methods of the presently disclosed technology provide solid films that persists after formation and in the absence of said sliding and/or rolling forces.

Pressures useful in methods of the presently disclosed technology may range from 100 MPa to 5 GPa, 100 MPa to 200 MPa, 200 MPa to 400 MPa, 400 MPa to 800 MPa, 800 MPa to 1.5 GPa, 1.5 GPa to 3 GPa, 3 GPa to 5 GPa or 5 GPa to 10 GPa.

Shear stresses useful in methods of the presently disclosed technology may range from 10 MPa to 0.5 GPa, 10 MPa to 100 MPa, 100 MPa to 200 MPa, 200 MPa to 500 MPa, or 500 MPa to 1 GPa.

Methods of the presently disclosed technology provide or include lubricants having at least partially capped nanocrystals in an amount of 0.01 to 2 percent by weight of the lubricant, 0.01 to 0.05 percent by weight of the lubricant, 0.05 to 0.1 percent by weight of the lubricant, 0.1 to 0.2 percent by weight of the lubricant, 0.2 to 0.3 percent by weight of the lubricant, 0.3 to 0.4 percent by weight of the lubricant, 0.4 to 0.5 percent by weight of the lubricant, 0.5 to 0.75 percent by weight of the lubricant, 0.75 to 1 percent by weight of the lubricant, 1 to 1.5 percent by weight of the lubricant, 1.5 to 2 percent by weight of the lubricant, or 2 to 10 percent by weight of the lubricant.

Methods of the presently disclosed technology involve or include formation of the solid film at a temperature in a contact region during the sliding and/or rolling in the range of −100° C. to 200° C., −100° C. to −50° C., −50° C. to −25° C., −25° C. to 0° C., 0° C. to 10° C., 10° C. to 20° C., 20° C. to 30° C., 30° C. to 40° C., 40° C. to 50° C., 50° C. to 60° C., 60° C. to 70° C., 70° C. to 80° C., 80° C. to 90° C., 90° C. to 100° C., 100° C. to 125° C., 125° C. to 150° C., 150° C. to 175° C., 175° C. to 200° C.

Lubricants of the presently disclosed technology may include a ZDDP additive, optionally present in an amount of 0.01 to 2 percent by weight of the lubricant, 0.01 to 0.05 percent by weight of the lubricant, 0.05 to 0.1 percent by weight of the lubricant, 0.1 to 0.2 percent by weight of the lubricant, 0.2 to 0.3 percent by weight of the lubricant, 0.3 to 0.4 percent by weight of the lubricant, 0.4 to 0.5 percent by weight of the lubricant, 0.5 to 0.75 percent by weight of the lubricant, 0.75 to 1 percent by weight of the lubricant, 1 to 1.5 percent by weight of the lubricant, 1.5 to 2 percent by weight of the lubricant, or 2 to 10 percent by weight of the lubricant.

Methods of the presently disclosed technology include forming the solid film on at least one surface or two surfaces that contains a steel composition.

Methods of the presently disclosed technology are able to form films and films formed according to the presently disclosed technology have a film hardness of 1 to 20 GPa, 100 MPa to 200 MPa, 200 MPa to 500 MPa, 500 MPa to 750 MPa, 750 MPa to 1 GPa, 1 GPa to 2 GPa, 2 GPa to 3 GPa, 3 GPa to 5 GPa, 5 GPa to 7 GPa, 7 GPa to 10 GPa, 10 GPa to 15 GPa, 15 GPa to 20 GPa.

Methods of the presently disclosed technology are able to form films and films formed according to the presently disclosed technology have Young's modulus of 50 GPa to 300 GPa, 50 GPa to 75 GPa, 75 GPa to 100 GPa, 100 GPa to 125 GPa, 125 GPa to 150 GPa, 150 GPa to 200 GPa, or 200 GPa to 250 GPa.

Methods according to the presently disclosed technology may involve or include a sliding or rolling of the surfaces in the contact region to induce a shear rate on the lubricant in the range of 0 to $10^7$ sec$^{-1}$, 0 to $10^2$ sec$^{-1}$, $10^2$ to $10^3$ sec$^{-1}$, $10^3$ to $10^4$ sec$^{-1}$, $10^4$ to $10^5$ sec$^{-1}$, $10^5$ to $10^6$ sec$^{-1}$, or $10^6$ to $10^7$ sec$^{-1}$, or a shear rate that induces a tribological shear stress.

Methods of the presently disclosed technology further optionally include or involve formation of an elasto-hydrodynamic lubricant (EHL) film and/or a boundary lubricant film and/or hydrodynamic lubricant film in the contact region.

Lubricants included in the methods of the presently disclosed technology and films formed by the methods may be an oil or a grease, or a synthetic, mineral or a natural lubricant, or contain at least one of a synthetic hydrocarbon, an ester, a silicone, a polyglycol or an ionic liquid, or is an oil having a viscosity in the range of 2 to 1000 mPas (cP), 2 cP to 10 cP, 10 cP to 50 cP, 50 cP to 100 cP, 100 cP to 500 cP, or 500 cP to 1000 cP, at a temperature of 100° C.

Methods of the presently disclosed technology and films provided by the presently disclosed technology may include lubricants containing at least one of an anti-wear (AW) additive, a friction modifier such as zinc dialkyldithiophosphates (ZDDP), or friction modifiers (FM), anti-oxidants, extreme pressure (EP) additives, anti-oxidants, anti-foams, detergents, dispersants, pour point depressants, or any other commonly used lubricant additives.

The presently disclosed technology provides a solid film on a lubricated surface containing a metal oxide crystallite, the crystallite having a mean size of 5-20 nm, 5 to 100 nm, 5 nm to 10 nm, 10 nm to 20 nm, 20 nm to 30 nm, 30 nm to 40 nm, 40 nm to 50 nm, 50 nm to 60 nm, 60 nm to 70 nm, 70 nm to 80 nm, 80 nm to 90 nm, or 90 nm to 100 nm, the film having an atomic ratio of carbon to metal in the range of 0 to 0.05, or 0.05 to 0.1, or 0.1 to 0.15, or 0.15 to 0.2, or 0.2 to 0.25, or 0.25 to 0.3, or 0.3 to 0.35, or 0.35 to 0.4, or 0.1 to 0.4.

Solid films of the presently disclosed technology optionally have a thickness of 20 to 500 nm, 20 nm to 50 nm, 50 nm to 100 nm, 100 nm to 200 nm, 200 nm to 300 nm, 300 nm to 400 nm, or 400 nm to 500 nm.

Solid films of the presently disclosed technology may have a film density 1.5-6 g/cm$^3$, 1.5 to 2 g/cm$^3$, 2 to 3 g/cm$^3$, 3 to 4 g/cm$^3$, 4 to 5 g/cm$^3$, or 5 to 6 g/cm$^3$.

The presently disclosed technology provides a method of delivering at least partially capped nanocrystals into the lubricated contact between two surfaces formed by sliding and/or rolling said surfaces so as to produce a pressure and/or shear stress on the lubricated surface and thereby forming a solid film, wherein the solid film is adhered to at least one of the surfaces, the lubricant comprising at least partially capped, metal oxide nanocrystals having a mean size of 3 nm to 20 nm, 3 nm to 5 nm, 5 nm to 10 nm, 10 nm to 15 nm, or 15 nm to 20 nm.

Methods of the presently disclosed technology provide solid films on at least two surfaces that may be portions of a piston ring-cylinder liner contact, a cam and lifter contact, a contact between a rolling element and races, gear teeth, or a hydrodynamic bearing shell and a rotor, or a hydrostatic bearing and stator or any other tribological contact surface with locally high pressures as described herein. The presently disclosed technology further provides a piston ring-cylinder liner contact, a cam and lifter contact, a contact between a rolling element and races, gear teeth, or a hydrodynamic bearing shell and a rotor, or a hydrostatic bearing and stator, or any other tribological contact surface with locally high pressures as described herein, containing a solid film of the presently disclosed technology.

BRIEF DESCRIPTION OF TABLES

TABLE 1: Surface parameters of the samples used in Example 1.
TABLE 2: Exemplary modulus and hardness measurement results of the tribofilm

BRIEF DESCRIPTION OF DRAWINGS

FIG. 8A: Optical profilometer image and line scan (solid lines) of a tribofilm formed by 1 wt % capped ZrO2 nanoparticles in PAO at 70° C. on a 52100 flat.

FIG. 8B: Optical profilometer line scan showing approximately 350 nm buildup of tribofilm on the surface of the flat.

The present disclosure provides the following additional embodiments.

EXAMPLES

Test Equipment

Reciprocating Rig

Figure 1A:
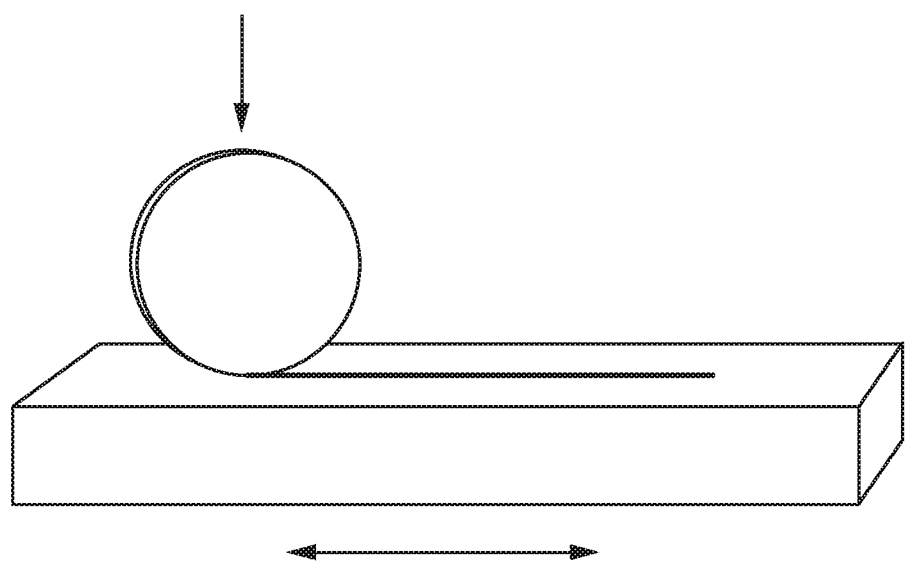
FIG. 1A: is an exemplary illustration of the reciprocating ball-on-flat tester used in Example 1—schematic of contact configuration—reciprocating ball-on-flat.
Figure 1B:
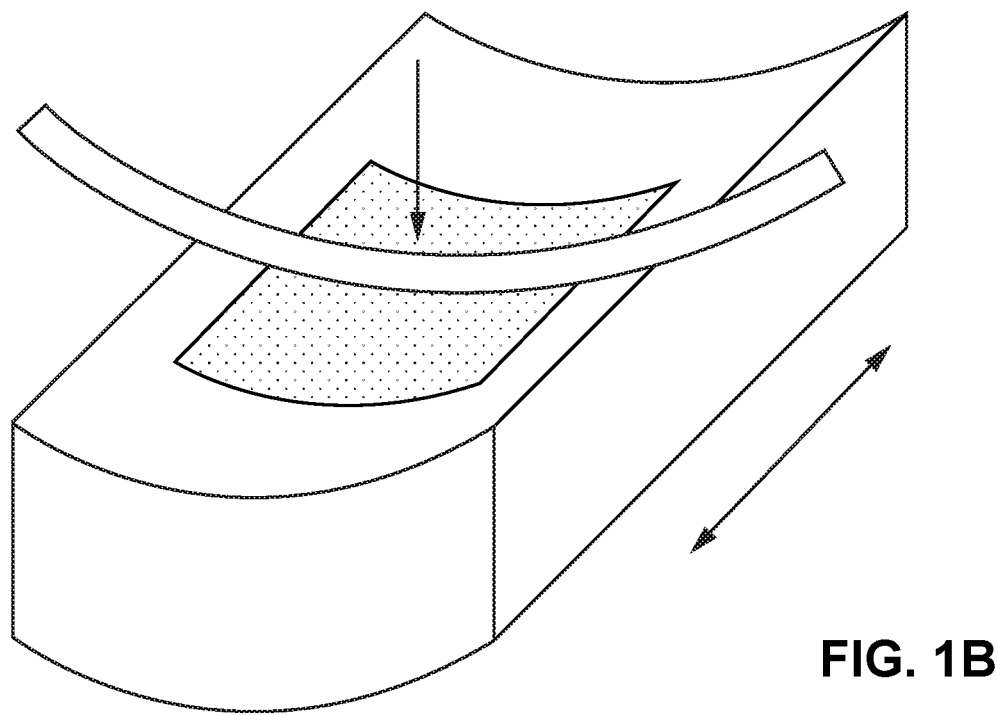
FIG. 1B: is an exemplary illustration of the reciprocating ball-on-flat tester used in Example 1—schematic of contact configuration—reciprocating ring-on-liner.
Figure 2A:
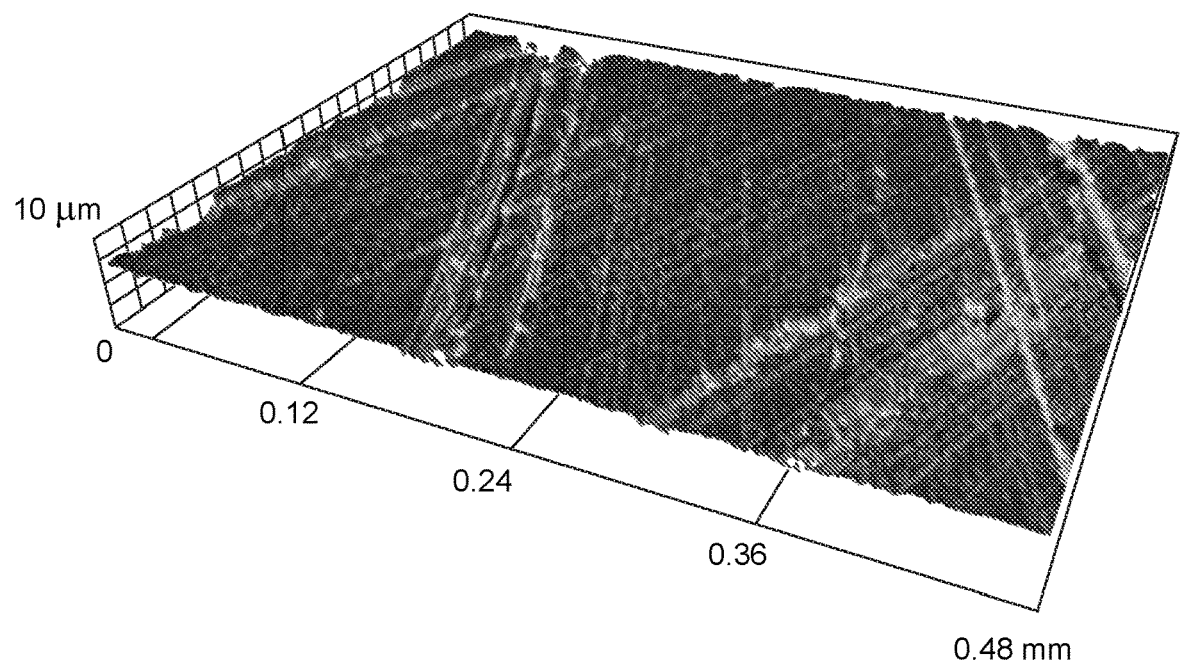
FIG. 2A: Profilometric images of optical profilometric image a slide-honed cylinder liner surface.
Figure 2B:
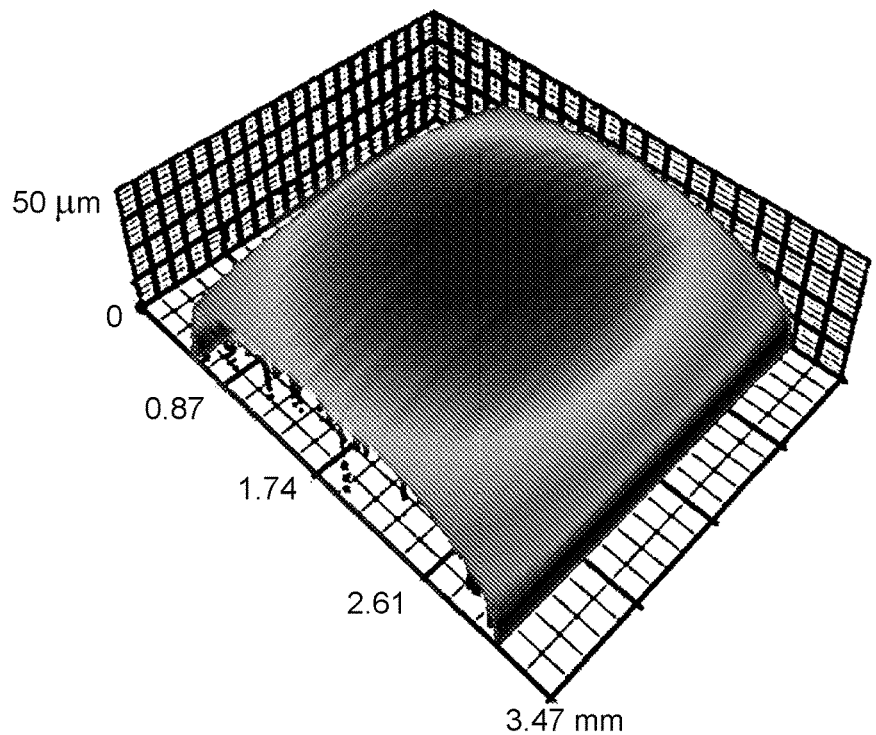
FIG. 2B: Profilometric images of optical profilometric image a top compression ring surface.

Experiments were performed with two contact configurations (ball-on-flat and ring-on-liner) on the same reciprocating tribometer. The ball-on-flat configuration used 52100 steel counterfaces and 12.7-mm (½-in.) diameter balls (Grade 25) sliding against mirror-polished flats (Sq=10 nm). The load of 15.6 N produced an initial peak Hertzian contact pressure of 1 GPa. The ring-on-liner configuration used specimens extracted from components in a commercial heavy-duty diesel engine. During all machining operations to extract test specimens, the original surfaces of the piston rings and cylinder liners were protected in order to retain the original surface roughness and honing pattern. The liners were gray cast iron with a typical honing pattern, and the ring was steel that had been coated with CrN by physical vapor deposition (PVD). The cylinder liner was mounted onto a reciprocating table on the bottom of the test rig, while the piston ring was stationary. The curvature of the ring was adjusted so that a Hertzian contact width of 10 mm was achieved. A load of 200 N produced a contact pressure of approximately 110 MPa, which is similar to the contact pressure experienced by the top compression ring at the top dead center (TDC) position in severe service. Schematics for the two contact configurations are shown in FIG. 1A and FIG. 1B. FIG. 2A and FIG. 2B shows profilometric images of the cylinder liner and top-compression ring surfaces, respectively. Their surface parameters are given in Table 1.

The cylinder liner was mounted onto a reciprocating table on the bottom of the test rig, while the piston ring was stationary. The curvature of the ring was adjusted so that a Hertzian contact width of 10 mm was achieved. A load of 200 N produced a contact pressure of approximately 110

MPa, which is similar to the contact pressure experienced by the top compression ring at TDC in severe service.

A small amount of oil (0.3 ml) was applied at the interface of the test components to create a thin layer at the start of each test. The tests were conducted at 1 Hz reciprocating frequency for 1 hour using a stroke length of 20 mm. Heating elements were embedded into the reciprocating table, and the temperature was controlled by a temperature control unit. Tests were performed at 70° C., 100° C., 130° C., and 160° C. respectively.

Micro-Pitting Rig (MPR)

Figure 3A:
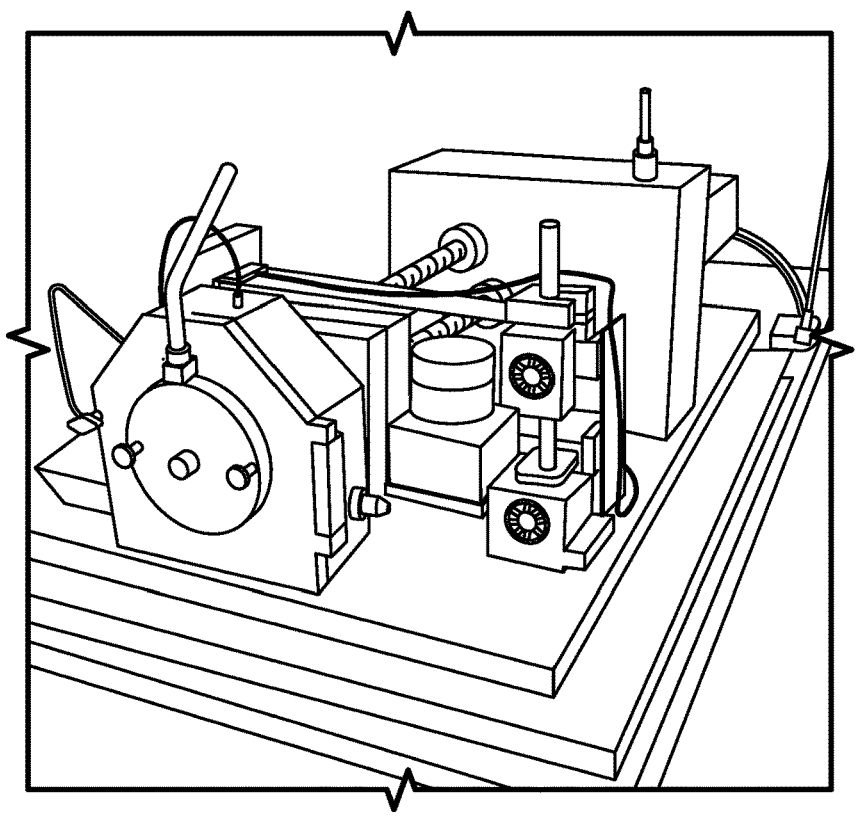
FIG. 3A: A photo of the Micro-Pitting Rig (MPR) used in the examples.
Figure 3B:
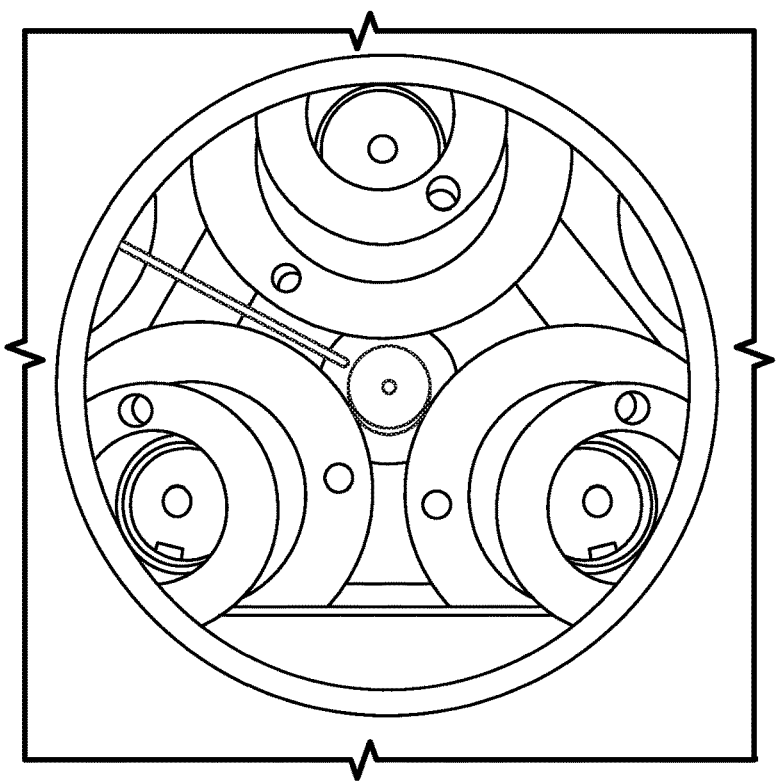
FIG. 3B: A close-up photo of the MPR used in Example 1 shows the lubricant at rest covering the lower portion of the test rings.
Figure 4:
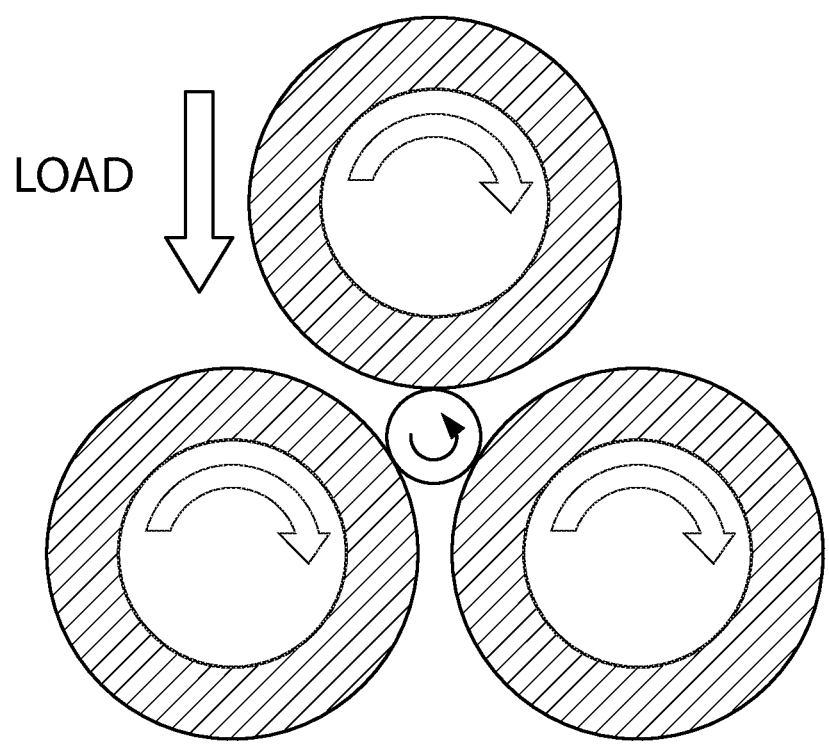
FIG. 4: Provides a schematic of the MPR contact configuration.

FIG. 3A is a photo of the Micro-Pitting Rig (MPR) available at ANL. It consists of a center roller in contact with three larger rings. FIG. 3B shows the lubricant at rest covering the lower portion of the test rings. The lubricant is supplied to the contact via splash lubrication. Both the rings and the barrel are uni-directionally satin ground. The contacting area is flat and approximately 1 mm wide. The roughness of a ring is approximately 150 nm. The rotation speed of the rings and roller are independently controlled allowing for a range of slide-to-roll (SRR) speed ratios. The load, speed, temperature, and SRR can all be controlled and set to a condition that is relevant for replicating gear tooth contact. Additionally, the materials and surface roughness of the samples can be tailored to match that of the gear components. During a test, the MPR is capable of measuring the friction force between the roller and the rings, as well as the vibration developed at the contact, indicating the severity of the accumulated surface damage. After a test, the roller and ring samples are analyzed to quantify the amount of surface wear. Further examination of the samples can be used to characterize the protective tribofilm that formed on the surface from the lubricant additives. MPR tests were performed to evaluate the friction and wear (and/or pitting) performance of lubricants formulated with $ZrO_2$ nanocrystal additives.

Characterization Techniques

Surface Profilometry

An interferometric non-contact optical profilometer (Bruker®, ContourGT, San Jose, Calif.) was used for measuring roughness, finish, and texture of a surface. Due to optical interference, micrographs of thin transparent films show colors that are a function of film thickness. In order to show the true surface of a tribofilm, the test components were coated with a thin layer of gold.

Microscopy

The wear tracks on the flats and cylinder liners after the tests were examined with an Olympus STM6 optical microscope, an FEI Quanta 400F scanning electron microscope (SEM), a Hitachi S-4700-II SEM, both equipped with energy dispersive x-ray spectroscopy (EDX) capability.

Nano-Indentation

A nanoindenter (Hysitron TI-950 Tribo-Indenter) was used to determine the hardness and modulus of these tribofilms formed on surfaces, under displacement control using a standard Berkovich tip. The same tip was used under scanning probe microscopy (SPM) mode to image the surface topography. The nanoindenter monitors and records the load and displacement of the indenter during indentation with a force resolution of about 1 nN and a displacement resolution of about 0.2 nm. The samples were placed on a magnetic horizontal holder and positioned with the aid of an optical microscope located above the sample. The area function parameters of the tip were calibrated using a fused quartz sample, and tip-shape calibration is based on determining the area function of the indenter tip.

Example 1

Capped nanocrystals can be dispersed into base oil with multiple capping agents at least as high as 10 wt % without significantly affecting the viscosity and appearance of the oil. Concentrations of 0.5 wt. %, 1 wt. %, 2 wt. % and 10%, three different, capping agents, temperature (25° C., 70° C., 130° C., 160° C.), time (5 mins, 20 mins, 60 mins, 4 hrs, 24 hrs), and type of oil were parameters that were investigated.

Figure 5A:
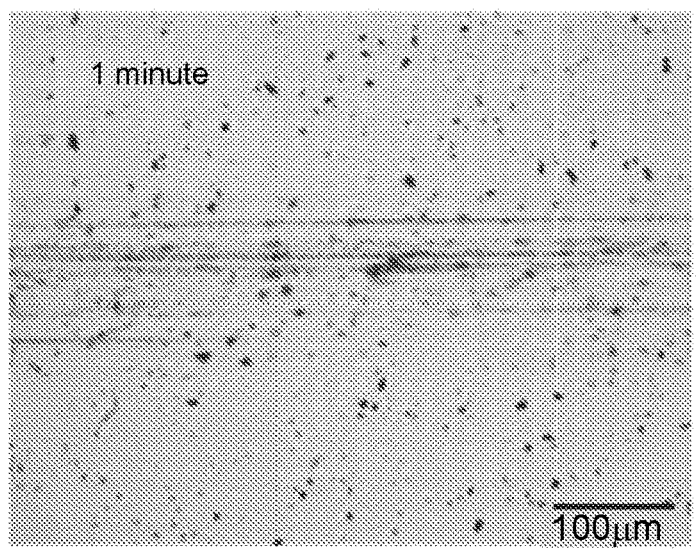
FIG. 5A. Optical Images of Tribofilms formed by ball-on-flat test after 1 minute.
Figure 5B:
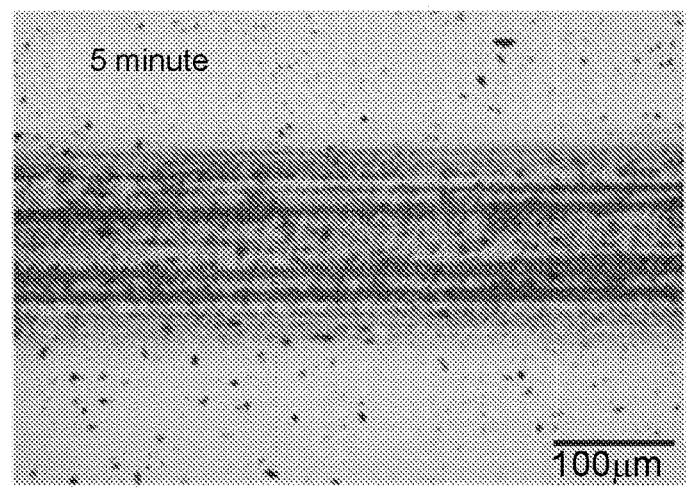
FIG. 5B. Optical Images of Tribofilms formed by ball-on-flat test after 5 minutes.
Figure 5C:
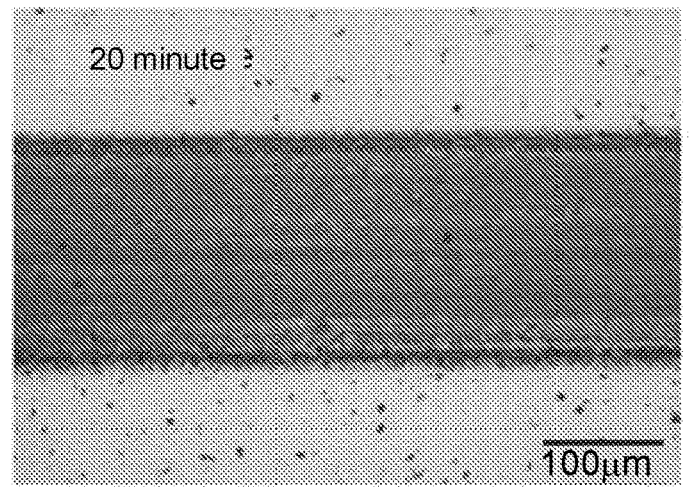
FIG. 5C. Optical Images of Tribofilms formed by ball-on-flat test after 20 minutes.

An important observation is the formation of a unique tribofilm by $ZrO_2$ nanocrystal additives regardless of temperature. A tribofilm started to form on the flat during the ball-on-flat test only 1 minute after the test started, and a thick and dense (as judged by optical profilometry) tribofilm was fully formed on the flat 20 minutes into the test, as shown in FIG. 5. Due to the relatively long stroke length, the flat experienced much less rubbing than the ball, on which a thick and dense tribofilm was fully formed after 20 minutes.

Figure 6A:
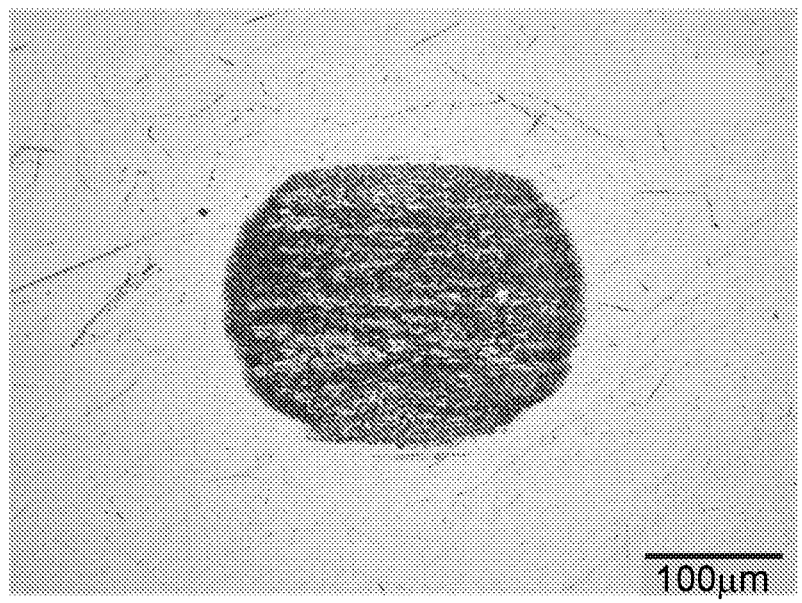
FIG. 6A. Optical image of ball test scar after room temperature ball-on-flat test using PAO4+1 wt % capped ZrO2 nanoparticles (PAO is poly-alpha-olefins).
Figure 6B:
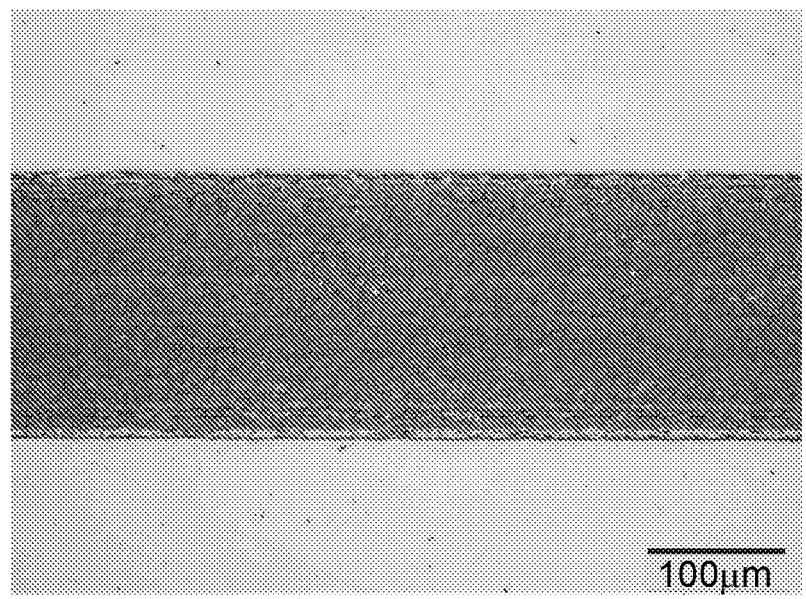
FIG. 6B. Optical image of flat test track after room temperature ball-on-flat test using PAO4+1 wt % capped ZrO2 nanoparticles.

The formation of a tribofilm was also observed at room temperature using PAO4 as base oil with 1 wt % capped $ZrO_2$.nanocrystals The ball test scar and flat test track are shown in FIG. 6A and FIG. 6B, respectively.

Figure 7A:
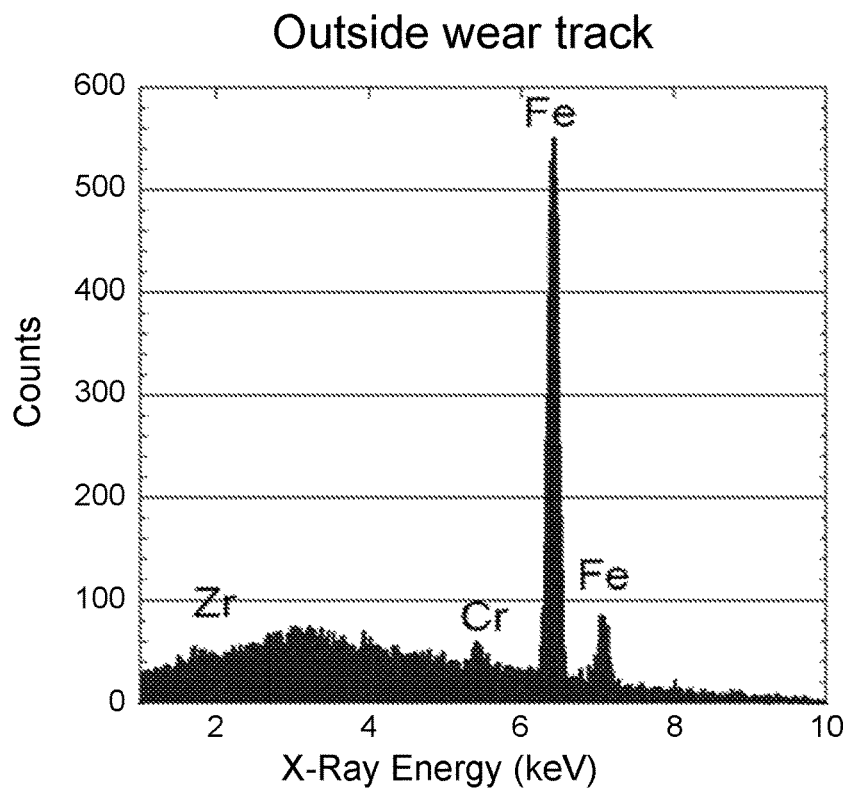
FIG. 7A: SEM-EDX (Scanning Electron Microscopy—Electron Dispersion Spectroscopy) spectrum taken outside the flat wear track on the flat formed by 2 wt % capped ZrO2 nanoparticles in PAO oil showing Fe as the dominant element.
Figure 7B:
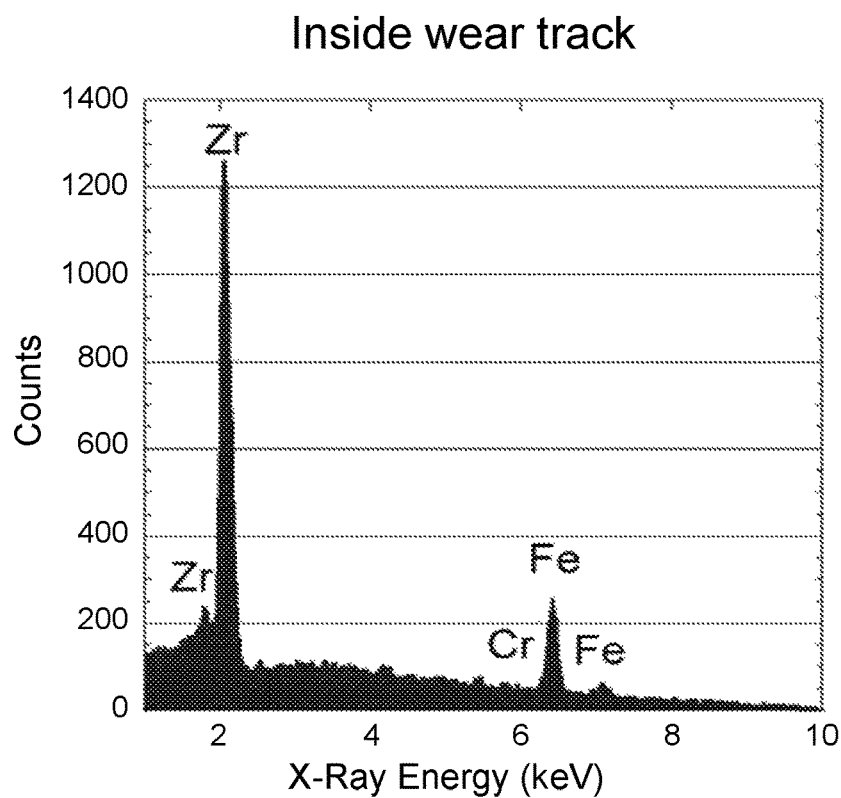
FIG. 7B: SEM-EDX spectrum taken inside the flat wear track showing Zr as the dominant element.

A prominent zirconium peak in the SEM-EDX spectrum was found in the wear track (FIG. 7B) but it was absent outside the wear track (FIG. 7A), indicating that the tribofilm was zirconium-rich and the tribofilm had indeed originated from the $ZrO_2$ nanocrystal additives.

Figure 8C:
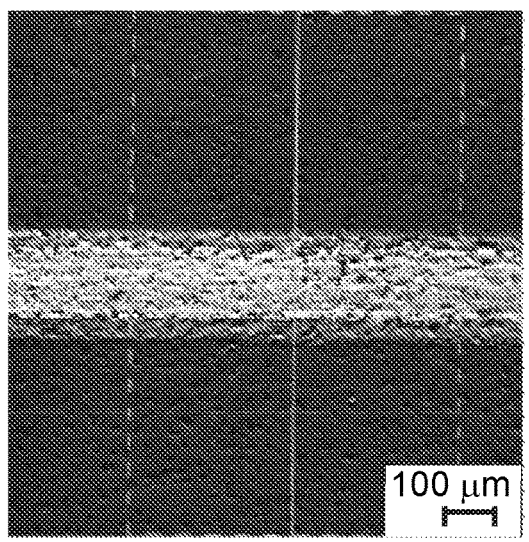
FIG. 8C: Region evaluated for the buildup rate of the tribofilm (box).
Figure 8C:
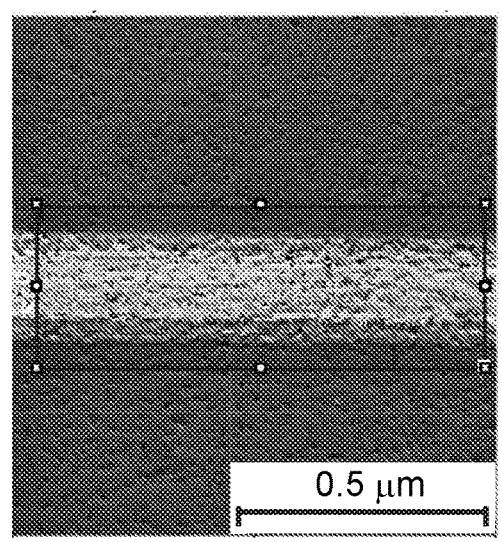
Figure 8C:
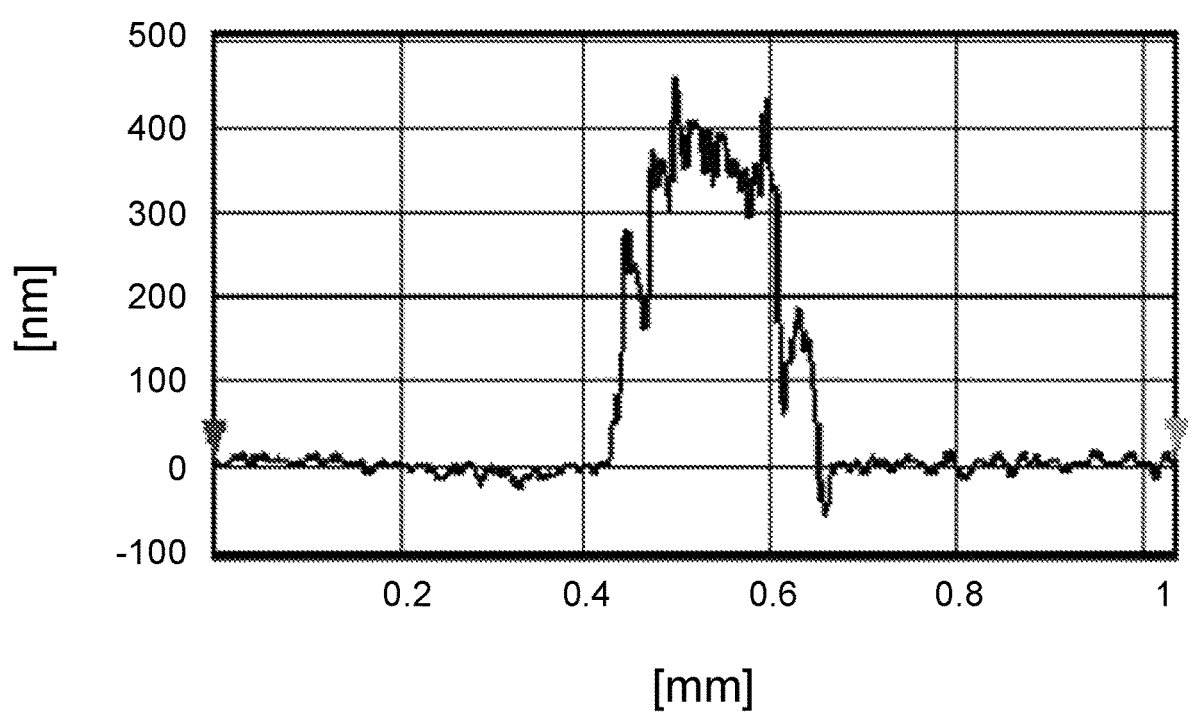

The tribofilms were semi-transparent so a thin gold layer was coated on the ball and flat by thermal evaporation to assure the accuracy when examined with optical profilometer. An optical image of a tribofilm obtained by the optical profilometer is shown in FIG. 8A. Instead of a net loss of material characteristic of wear, there was actually a net increase of material on the wear track. Line scans (vertical solid line) across the film revealed that the tribofilm has a height of about 350 nm above the flat surface (FIG. 8C).

Quantitative evaluation of the area marked in the FIG. 8B by a solid rectangle showed a net nanocrystal-based tribofilm build-up rate of 62,700 μm3 per mm of sliding distance per hour, approximately 1/300 of the total nanocrystal loading included in the amount of oil used in the tests. This indicated that there are significant amounts of nanocrystals left to continue re-generating the tribofilm. The tribofilm was also relatively smooth, the root mean square (RMS) roughness of the tribofilm was measured to be 170 nm while for the mirror polished flat the value was 40 nm.

Figure 9:
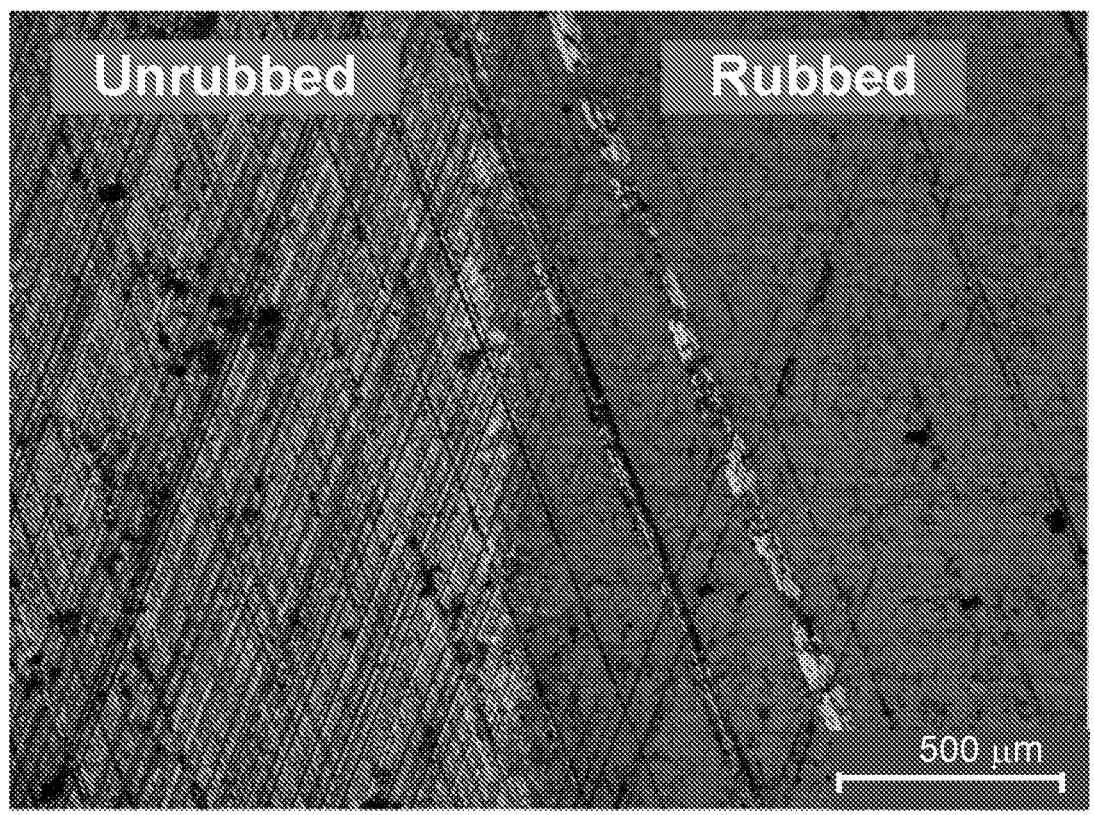
FIG. 9: An exemplary micrograph showing tribofilm formation on a liner after a test at 100° C. using PAO10+1 wt % capped ZrO2 nanocrystals.

A tribofilm was also formed on liner segments in ring-on-liner tests at a range of conditions as shown in an exemplary image in FIG. 9.

The modulus and hardness of the tribofilm were also measured using nano-indentation, and exemplary results are shown in Table 2, together with the results of the steel flat. The tribofilm possess very impressive modulus and hardness, only ~30% less than 52100 in both cases. A tribofilm that is hard, but slightly softer than the surface material can provide sufficient load bearing capability as a rubbing surface while serving as a protective, regenerative layer if the stress is too high.

Figure 10:
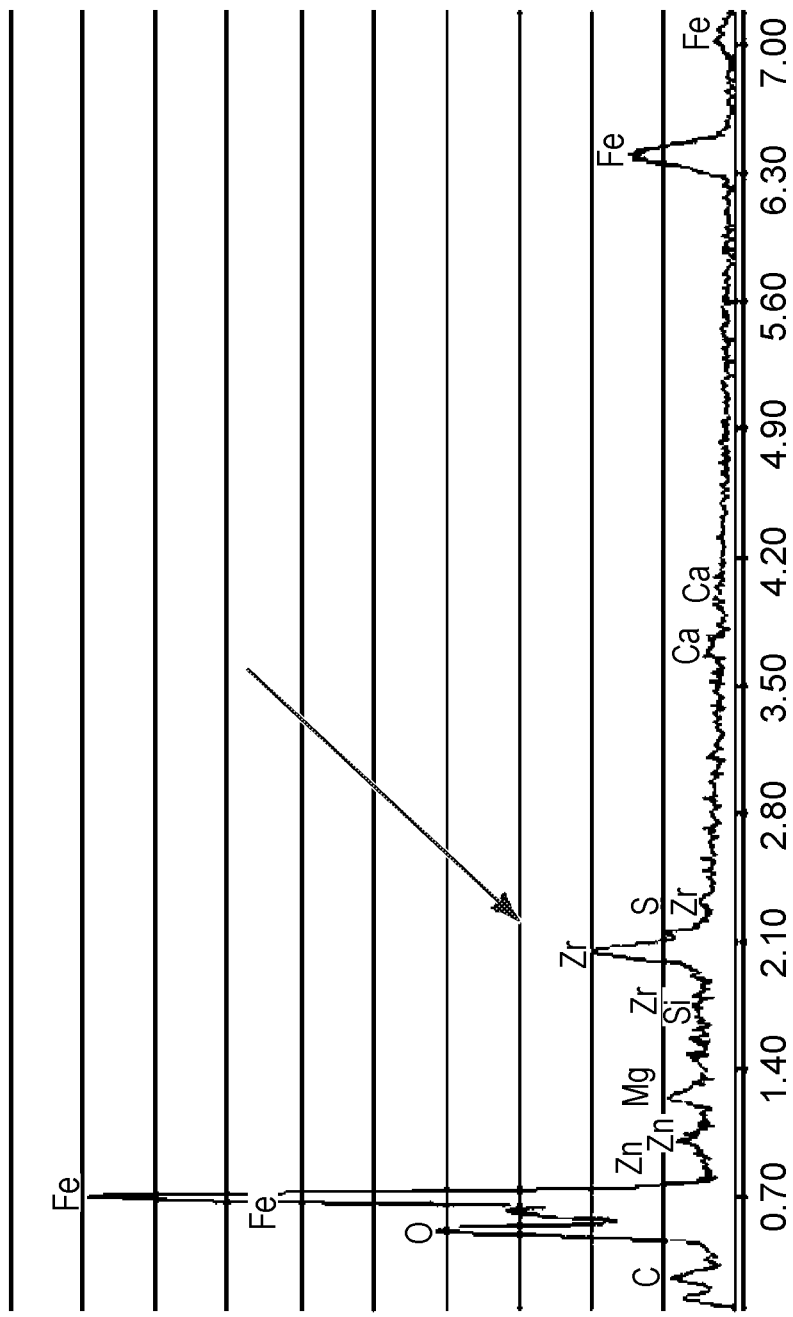
FIG. 10. EDX spectrum performed inside wear track of a flat tested with Mobil 1 10W30 and 1 wt % capped ZrO2 nanoparticles.

A tribofilm also formed by adding capped $ZrO_2$ nanoparticles in a fully formulated oil (Mobil 1 10W30). The presence of Zr was confirmed with EDX after a test. The result is shown in FIG. 10.

Figure 11:
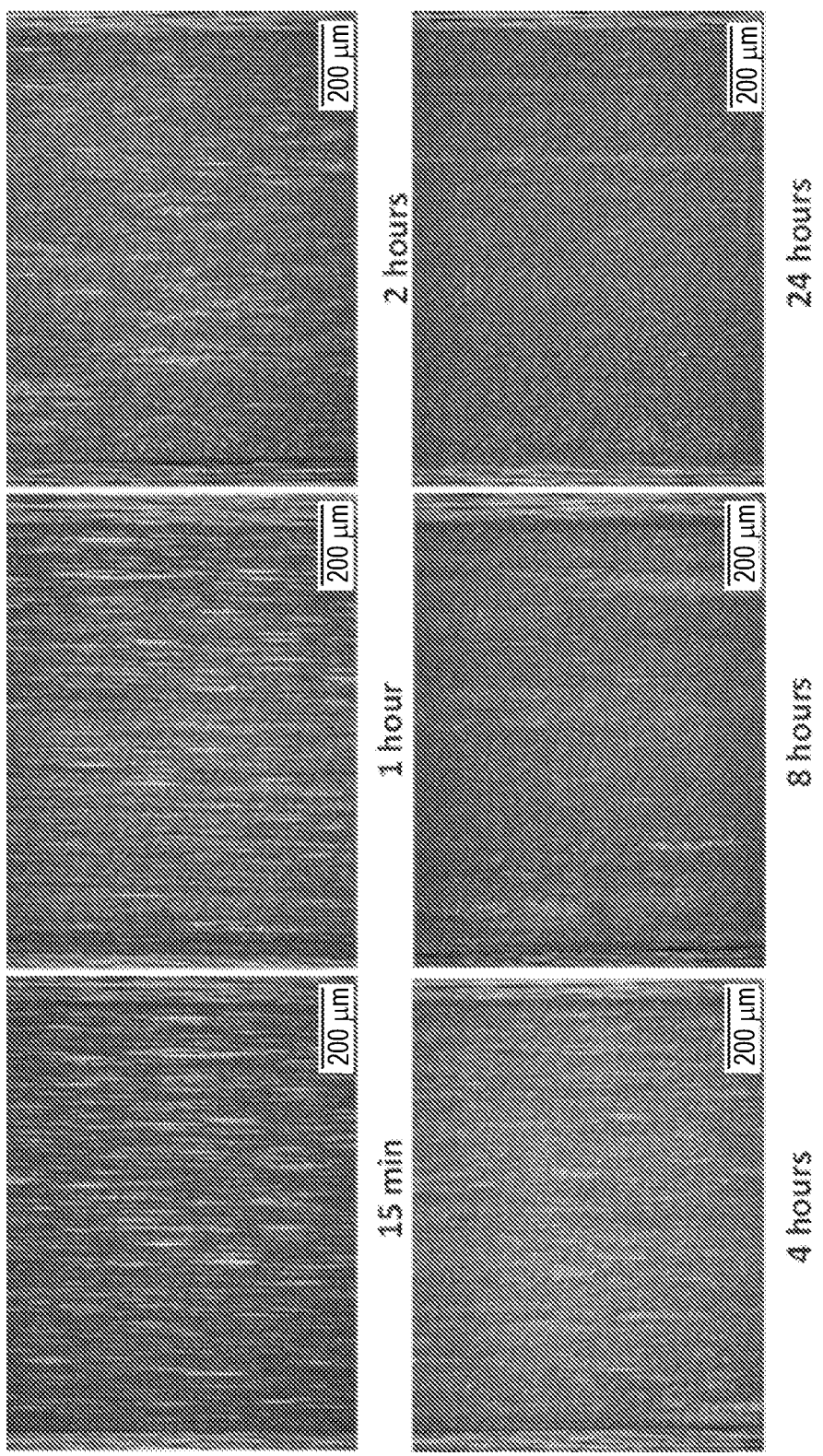
FIG. 11: Evolution of tribofilm formation on the ring under for pure sliding during an MPR test.

A tribofilm formed under pure rolling conditions in an MPR test, at a load of 200 N, speed of 2 m/s, and a temperature of 70° C., as early as 15 minutes (143,000 cycles), continued to grow over time, and became more uniform throughout the test. The film was maintained up to 24 hours of testing (13.8 million cycles). The evolution of the tribofilm is shown in FIG. 11.

Figure 12:
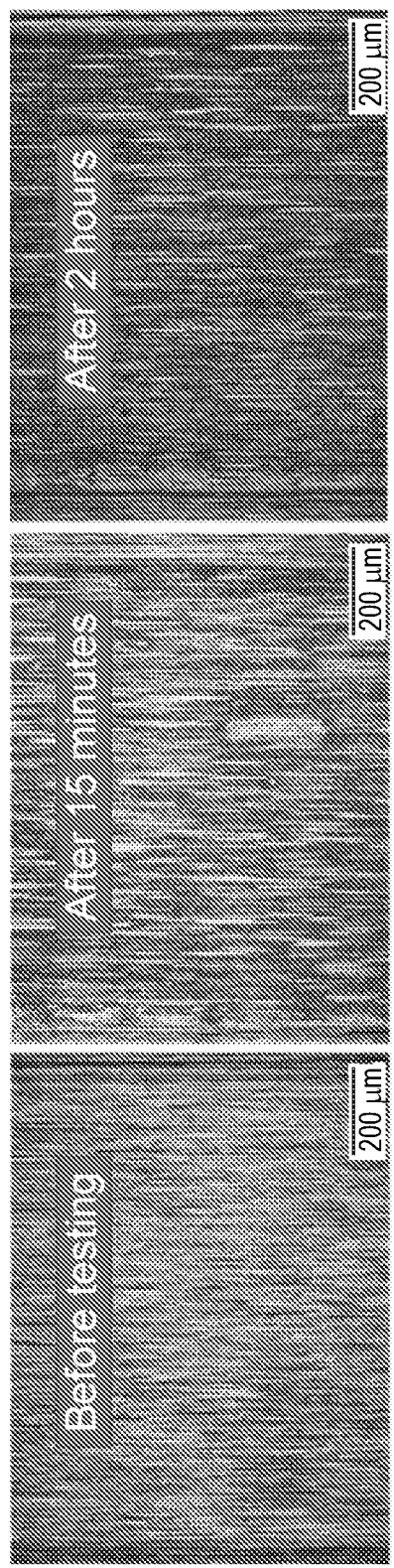
FIG. 12: Evolution of tribofilm formation on the ring up to 2 hours during an MPR test.

A tribofilm also formed under a combination of rolling and sliding conditions in an MPR using capped ZrO2 nanocrystals loaded mineral oil. The evolution of the tribofilm is shown in FIG. 12.

Figure 13A:
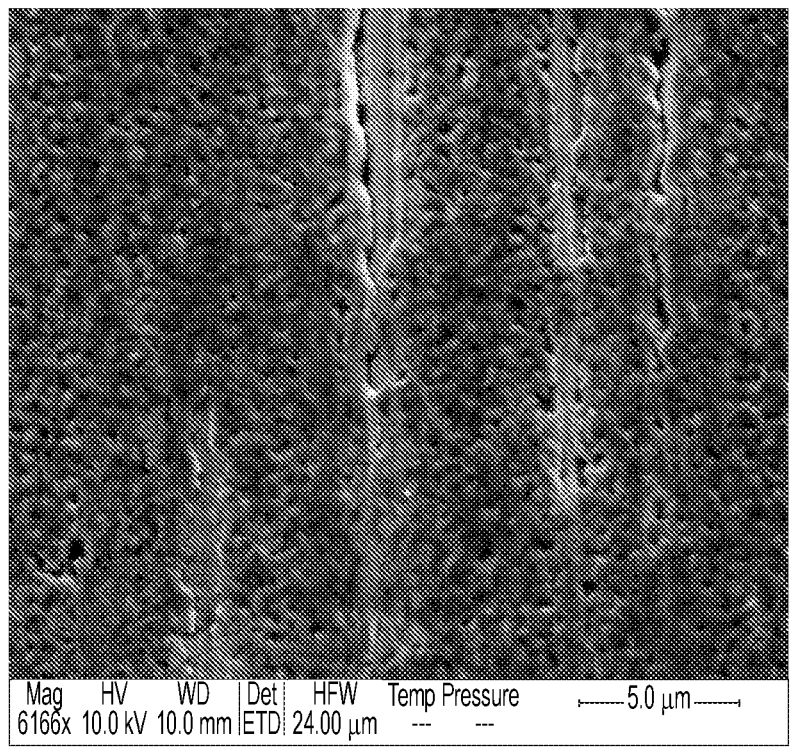
FIG. 13A: SEM image of an area inside the test track on the ring after an MPR test.
Figure 13B:
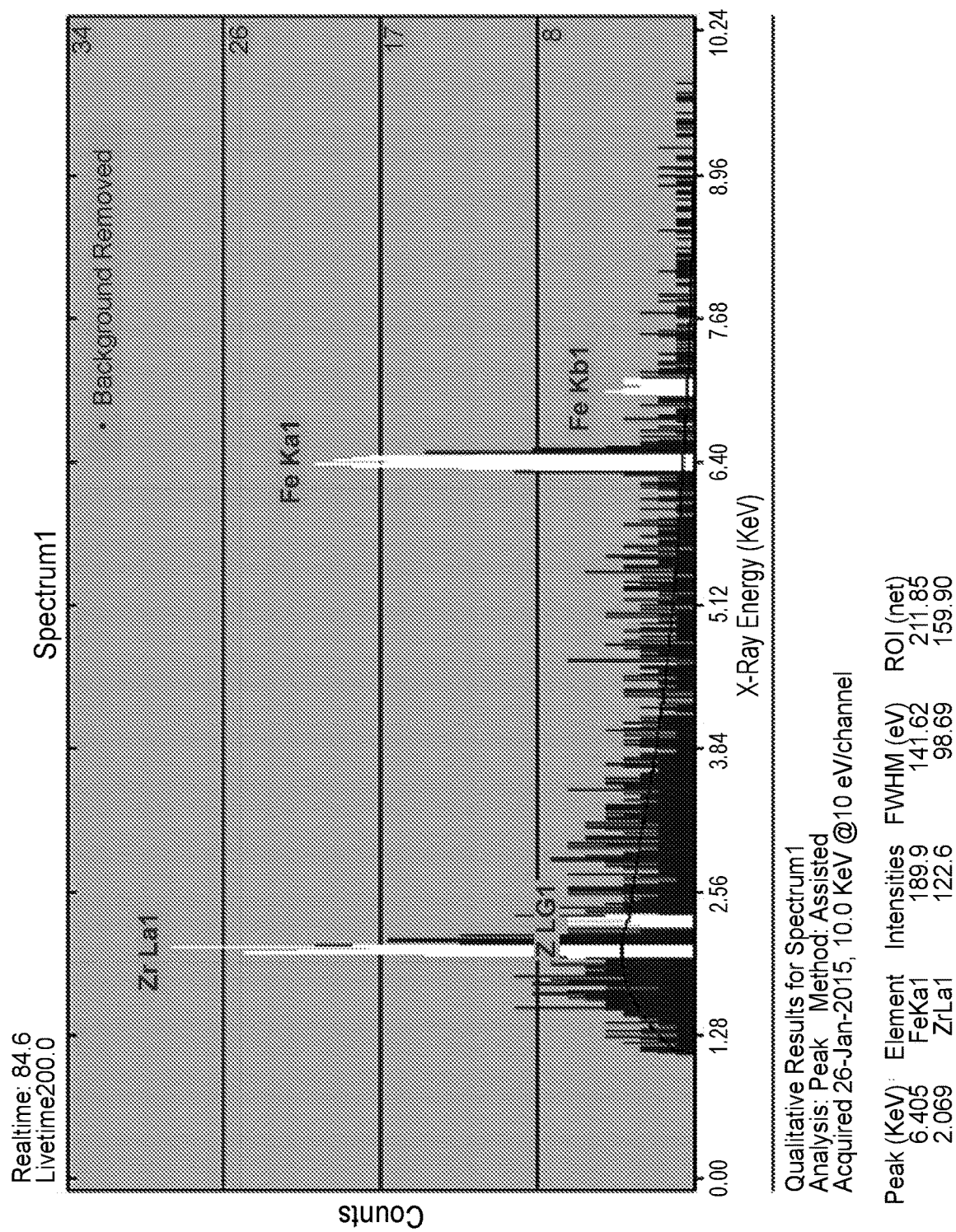
FIG. 13B: EDX spectrum of an area inside the test track on the ring after an MPR test.
Figure 14A:
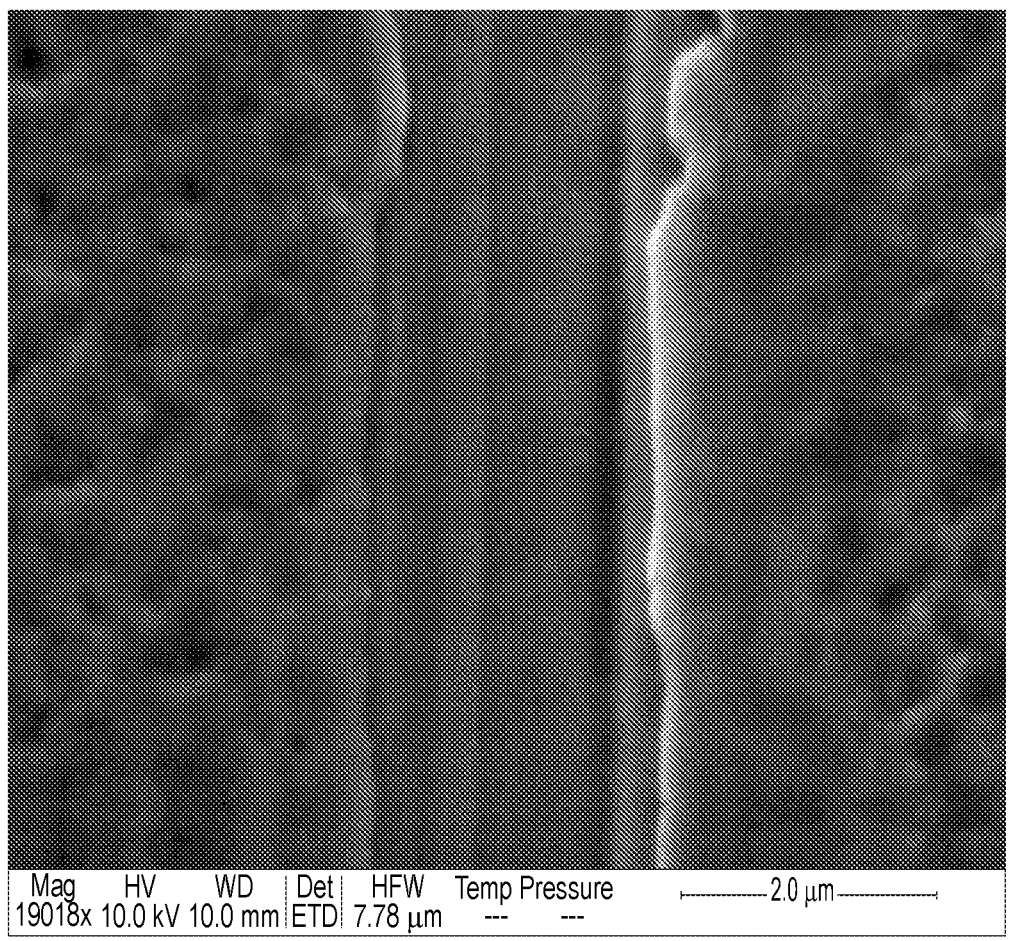
FIG. 14A: SEM image of an area inside the test track on the ring focused on a groove.
Figure 14B:
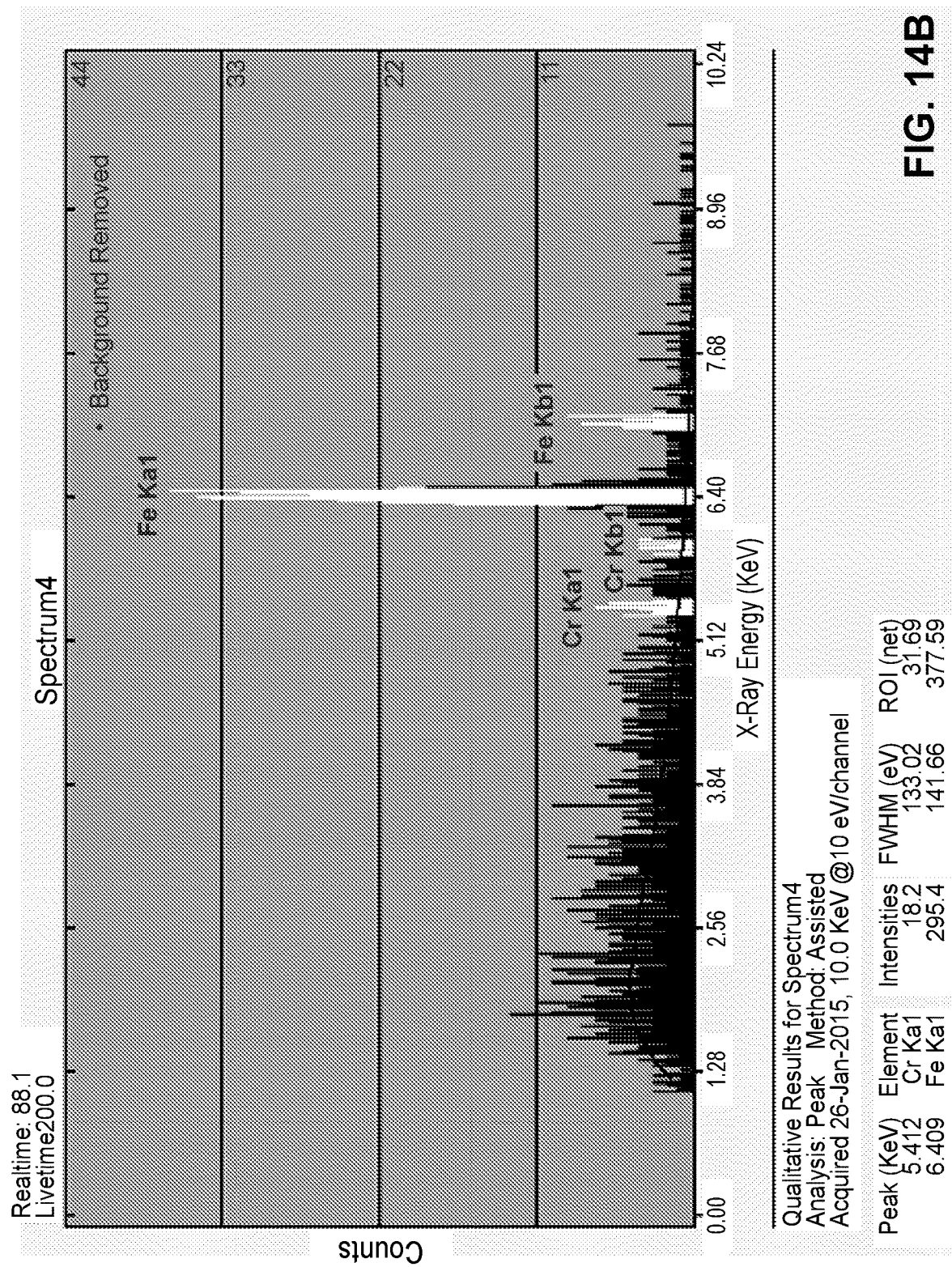
FIG. 14B: EDX spectrum of an area inside the test track on the ring focused on a groove.

FIG. 13A showed an SEM image of part of the tribofilm inside the test track on the ring after the MPR test. And EDX analysis was performed and indicated the presence of Zr on the test track on the ring, as shown in FIG. 13B. Also, grooves were observed on the tribofilm and an SEM image of the groove is shown in FIG. 14A, and EDX inside the grooves showed no Zr (FIG. 14B) which means that the grooves are not filled with $ZrO_2$ nanocrystals.

Example 2

Figure 15:
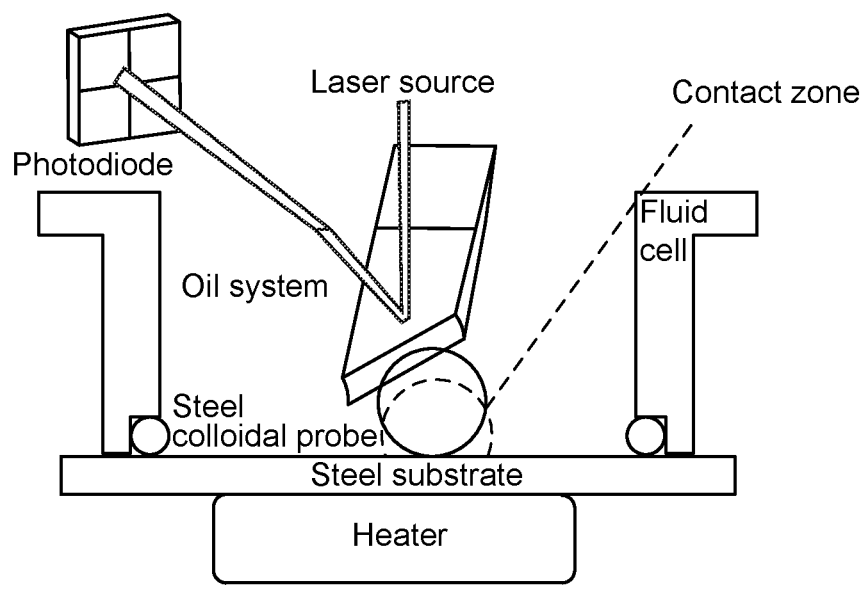
FIG. 15: A schematic of the AFM configuration used for generating tribofilms.
Figure 16A:
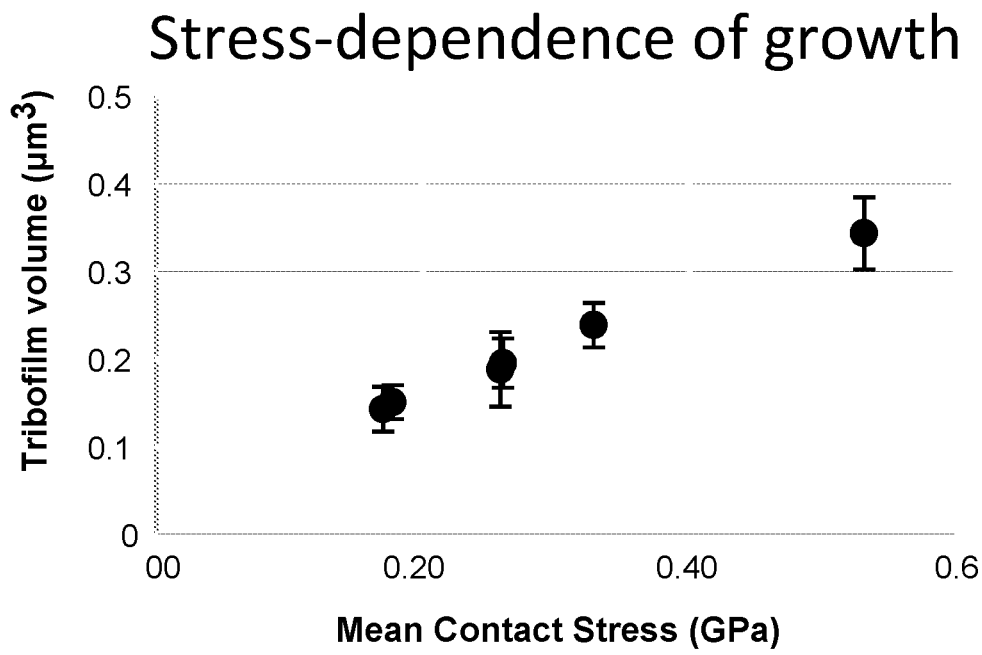
FIG. 16A: The tribofilm growth volume as function of mean contact stress, in an AFM set up.
Figure 16B:
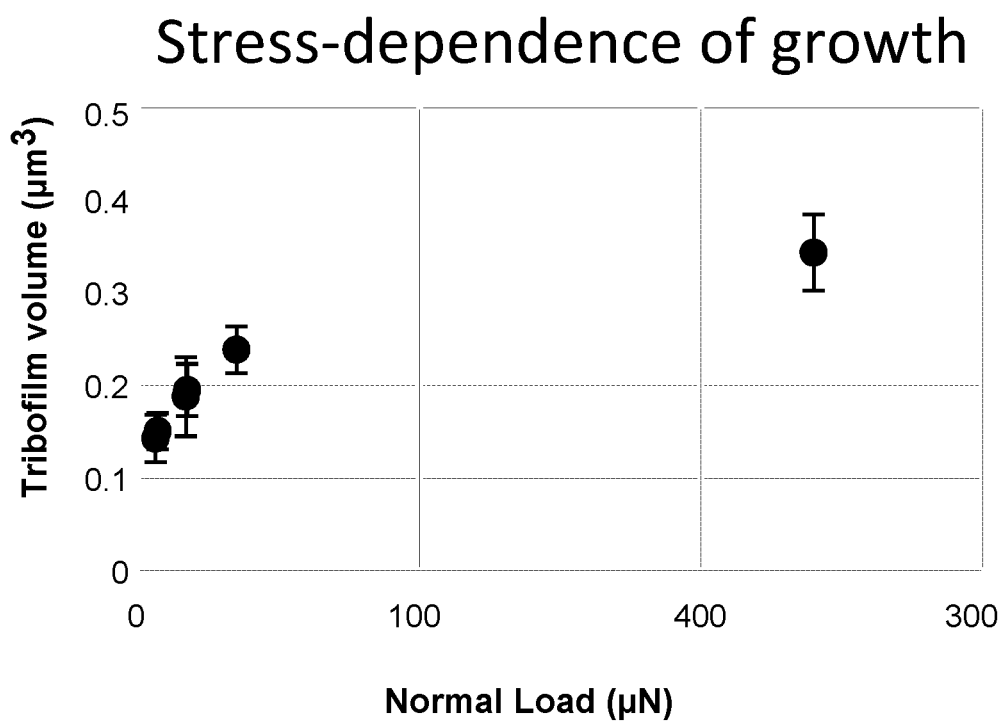
FIG. 16B: The tribofilm growth volume as function normal load, in an AFM set up, demonstrating stress-driven behavior.

Tribofilms with the capped $ZrO_2$ nanocrystals were also generated in an atomic force microscope (AFM) at the interface formed by a steel microsphere (ranging between 10 and 100 μm in diameter) against either a 52100 steel substrate, or a silicon substrate or a yttria-stabilized zirconia substrate (illustrated in FIG. 15). The contact stress at the sliding contact was varied between 0.1 GPa and 1 GPa. Zirconia tribofilms exhibit a stress-driven growth process where increasing the contact stress increases the thickness of the tribofilms (FIG. 16). Increasing surface roughness increases the rate of tribofilm growth. These tribofilms are strongly bound to the substrate and resist removal during continued sliding with the AFM probe in either base oil or in dry sliding.

Figure 17A:
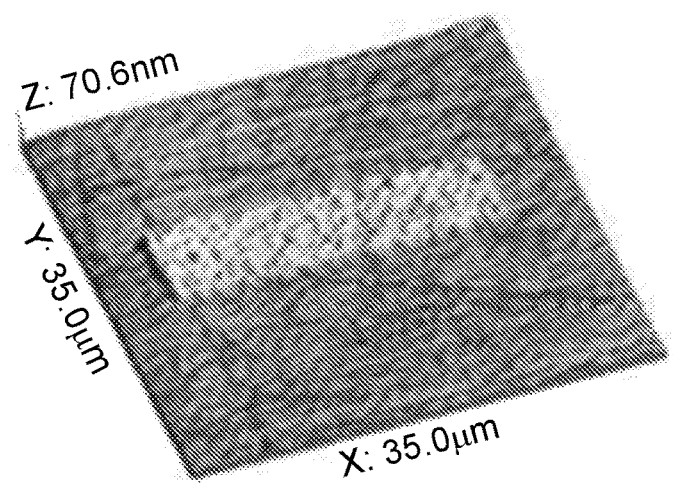
FIG. 17A: An exemplary aerial view of the tribofilm generated by an AFM.
Figure 17B:
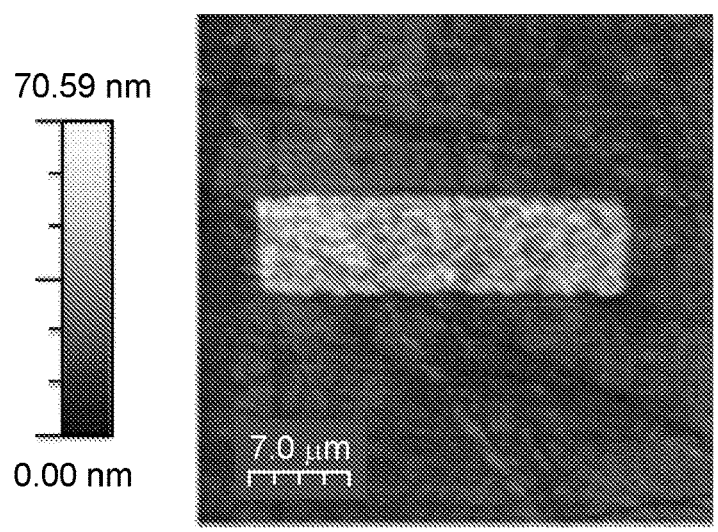
FIG. 17B: An exemplary top view of the tribofilm generated by an AFM.
Figure 17C:
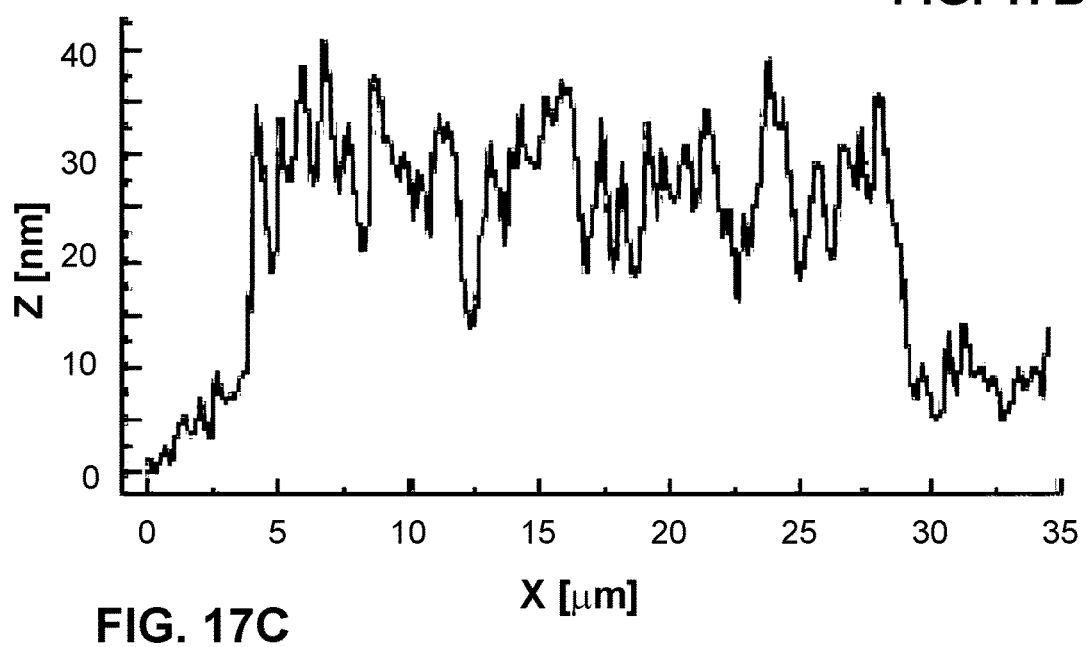
FIG. 17C: An exemplary line scan of the tribofilm generated by an AFM.

Using the AFM, tribofilms with lateral dimensions as small as 2 μm and as large as 50 μm were generated, with local thickness varying from 10 nm to 200 nm (example shown in FIG. 17).

Tribofilms in the AFM were generated in concentrations of capped zirconia nanoparticles ranging from 0.01 wt. % in PAO4 to 10 wt. % in PAO4. Additionally, tribofilms were generated in other base stocks, including mPAO SYN65.

Figure 20A:
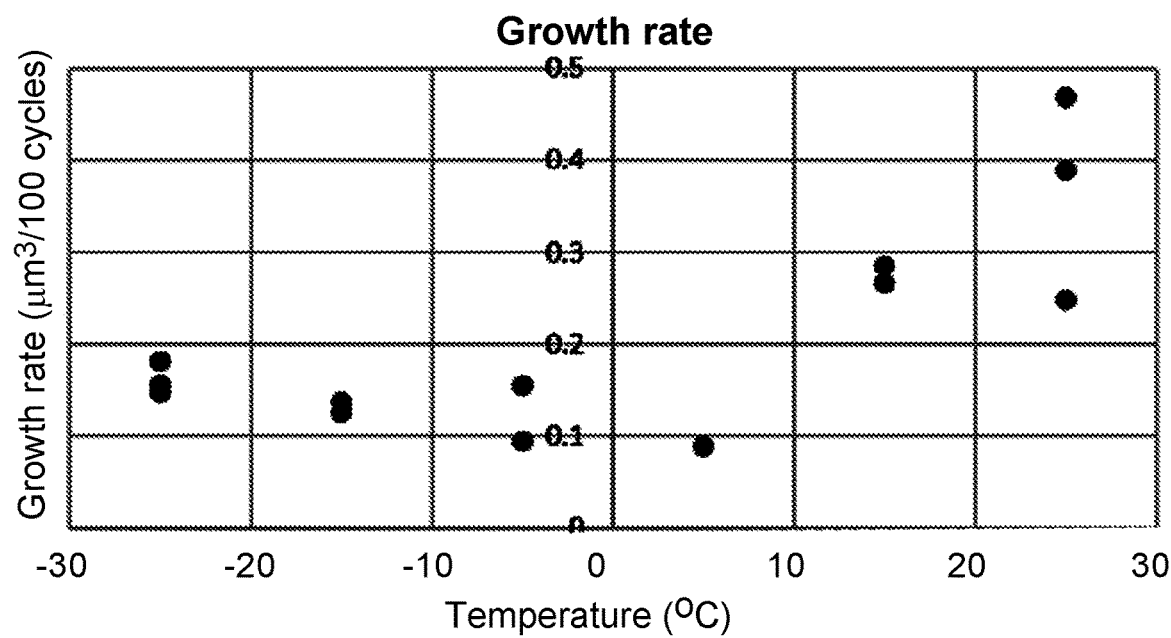
FIG. 20A: Growth rates and cycles to tribofilms nucleation plotted for various sub-ambient test temperatures. Under tested contact conditions, tribofilm growth is observed for all temperatures between −25° C. and 25° C. although some variation in growth rate is observed.
Figure 20B:
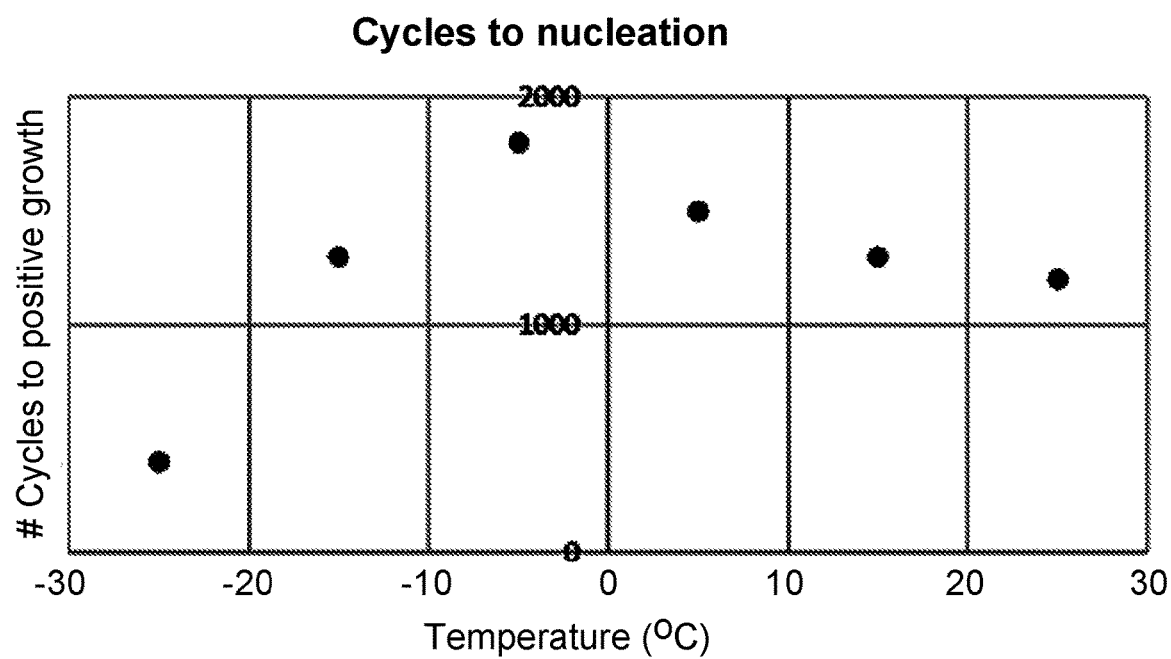
FIG. 20B: Growth rates and cycles to tribofilms nucleation plotted for various sub-ambient test temperatures—reducing interfacial temperature reduces the cycles-to-nucleation resulting in a more rapid growth initiation.

Using the AFM, tribofilms were generated at temperatures ranging from −25° C. to 130° C. (FIG. 20 shows a range of temperature from −25° C. to 25° C.).

Tribofilm microstructure and chemical composition were analyzed by performing focused-ion beam (FIB) milling to produce a cross-sectional sample of the tribofilm, followed by observation in scanning electron and transmission electron microscopes (SEM/TEM).

Figure 18:
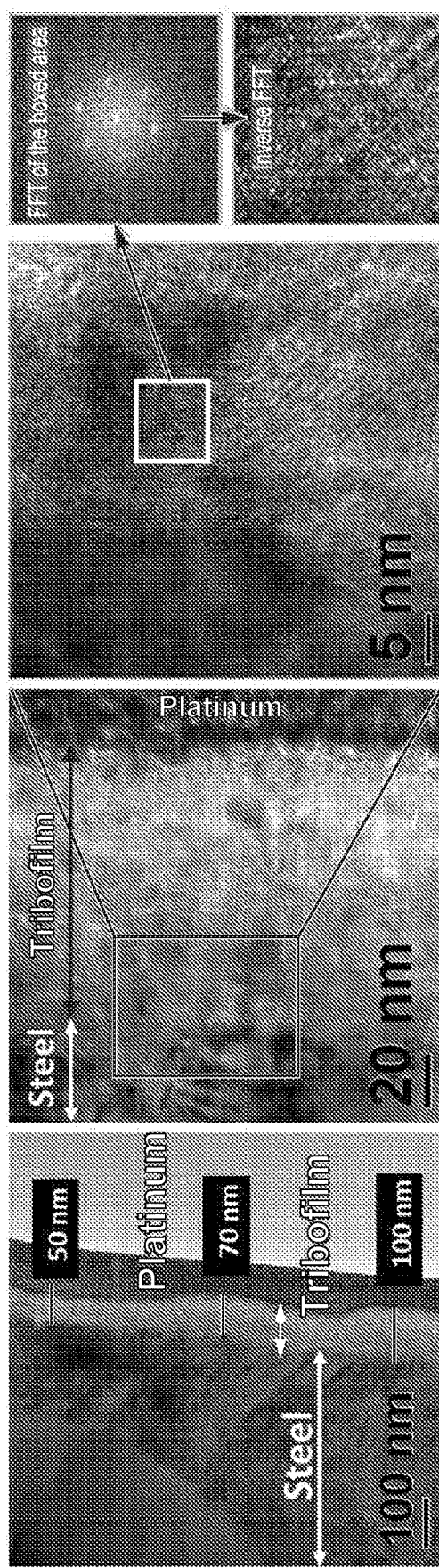
FIG. 18: Cross-sectional imaging of the zirconia tribofilms at different magnification showing polycrystalline structure.

Cross-sectional imaging of the tribofilms show a nearly fully dense microstructure with no observable voids. Diffraction analysis confirms that the tribofilms consist of a mostly polycrystalline structure, identified to be zirconia. Through cross sectional imaging, evidence of grain growth and coalescence of individual 5 nm zirconia nanoparticles is also seen, as shown in FIG. 18.

Figure 19A:
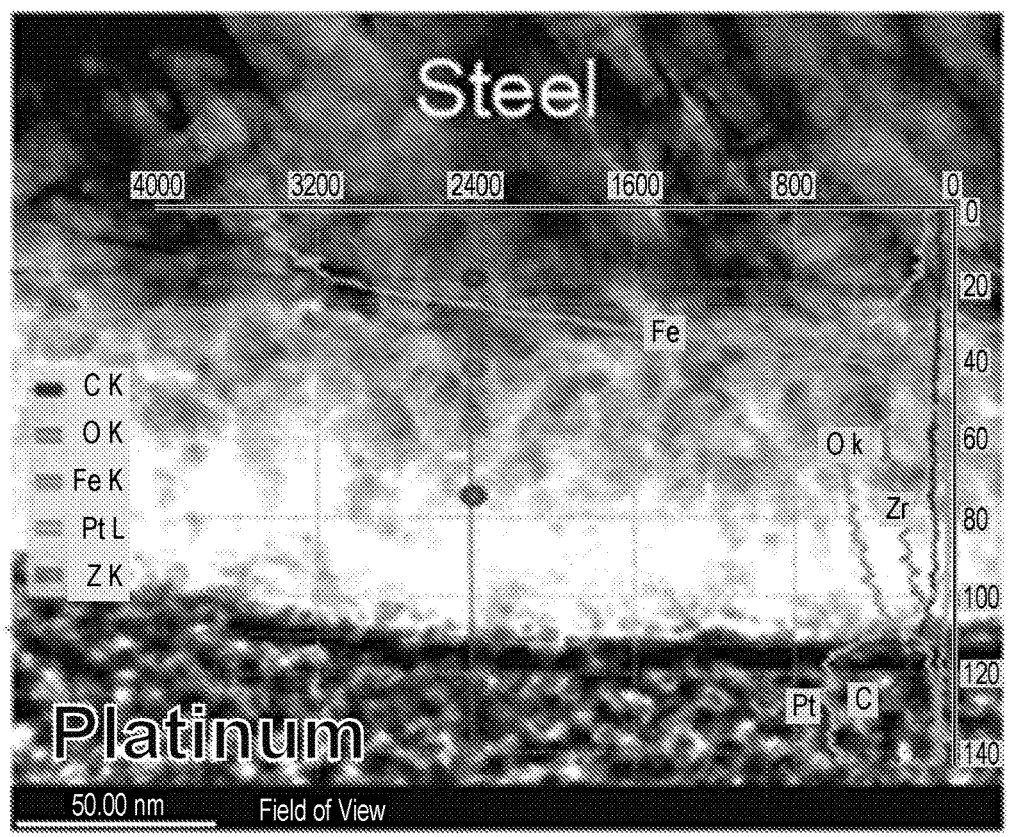
FIG. 19A: A cross-sectional TEM image of a tribofilm formed by AFM.
Figure 19B:
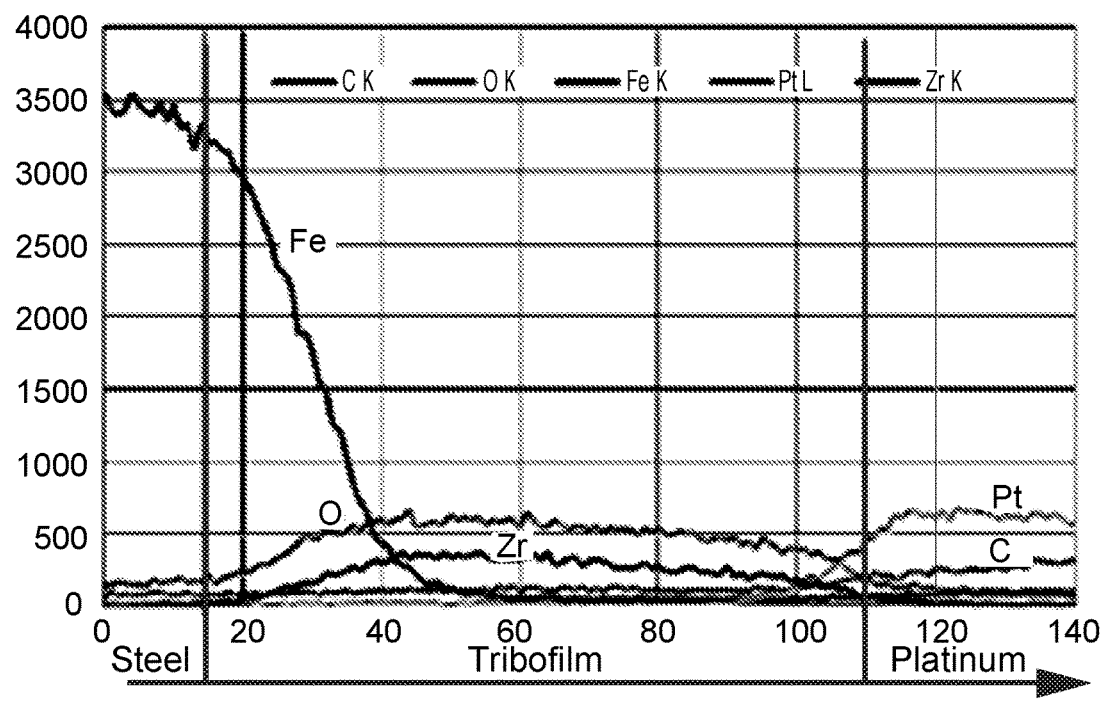
FIG. 19B: Cross-sectional EDX mapping of the same tribofilm showing that zirconia tribofilms are deficient in carbon-containing capping agents and the composition of Fe and Zr formed compositional gradients inside the tribofilm at different depths.

Through these cross-sectional images and accompanying chemical spectroscopy (such as EDX, EELS and FTIR), it is confirmed that zirconia tribofilms are deficient in carbon, indicating that tribological stresses during sliding result in the removal of capping agents prior to tribofilms formation (FIG. 19).

The mechanism of tribofilms growth as deduced from these images is as follows: nanoparticles undergo selective removal of surface ligands, i.e. capping agents, at the sliding contact due to tribological stresses. In the absence of dispersing ligands, the nanoparticles interact strongly with the substrate and each other and tribological stresses cause the nanoparticles to bind strongly to the substrate and to each other, resulting in the nucleation and growth of a compact tribofilm. As the film grows, stress-driven grain coarsening occurs. Tribofilms generated in the sliding contact of the AFM show superior mechanical properties. The modulus and hardness of these films was measured to be about 160 GPa and 7.3 GPa, respectively. These values approach known literature values of bulk zirconia.

Tribofilms in the AFM were also generated with a mixture of capped zirconia nanoparticles mixed with zinc dialkyldithiophosphates (ZDDP) anti-wear additives. In these measurements, zirconia was added to a PAO4 base oil in either 9 wt. %, 1 wt. %, 0.1 wt. % or 0.01 wt. %, and mixed with 0.8 wt. % ZDDP. With this oil containing both ZDDP and capped zirconia nanoparticles, measurements were made at a variety of temperatures including 25° C., 15° C., 5° C. and −5° C. Other parameters for these AFM tests (load, speed, etc.) were similar to those indicated in example 2. For all tested temperatures, and for all concentrations of capped zirconia mixed with ZDDP additive, a tribofilm growth and formation was observed in the AFM. Similar results are expected for lower temperatures, such as −15° C. and −25° C. These zirconia-ZDDP tribofilms were morphologically similar to pure zirconia tribofilms. However, for identical test conditions and durations, the zirconia-ZDDP tribofilms generated had a significantly higher thickness (i.e. volume) compared to pure zirconia tribofilms. In addition, tribofilms formed within the AFM with zirconia-ZDDP mixed in PAO4 were found to nucleate on the surface much more rapidly in comparison to pure zirconia tribofilms, which resulted in a significantly rapid tribofilms growth initiation.

Figure 21:
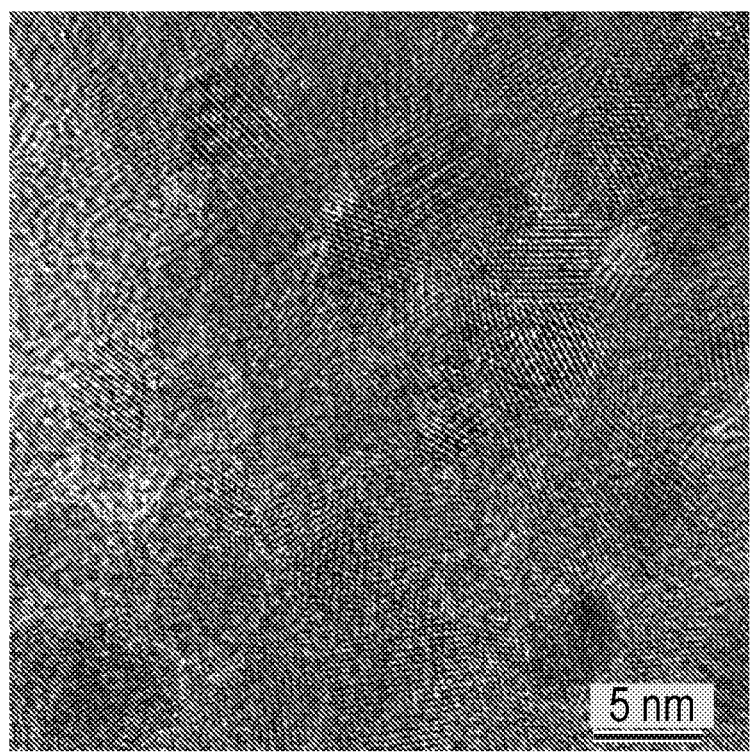
FIG. 21: Cross-sectional TEM image of a tribofilm formed by AFM using a PAO4 base oil consisting of 9 wt. % zirconia with 0.8% wt. % ZDDP. Cross-sectional images show that ZDDP restricts grain coalescence and growth normally seen in pure zirconia tribofilms.
Figure 22:
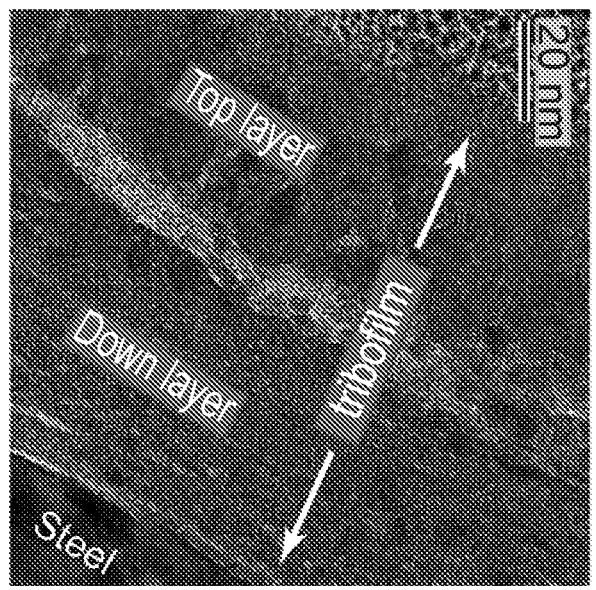
FIG. 22: Cross-sectional TEM image of a tribofilm formed by AFM using a PAO4 base oil consisting of 9 wt. % zirconia with 0.8% wt. % ZDDP (left) and EDX analysis performed across the cross-section of this tribofilms (right). EDX confirms the presence of zirconia in the tribofilms, as well as phosphorous, sulfur and zinc, which confirms that these tribofilms consist of a ZDDP phase mixed with zirconia.

Cross-sectional imaging of tribofilms formed in oils containing both zirconia and ZDDP exhibit zirconia nanocrystal sizes of 5 nm, which indicate that ZDDP is effective in inhibiting grain growth and coalescence as is seen in pure zirconia tribofilms (FIG. 21). Chemical spectroscopy of FIB/SEM cross-sections of these ZDDP-zirconia tribofilms indicate the presence of both zirconia, as well as zinc, phosphorous and sulfur, and a relative high concentration of carbon, which confirm that these tribofilms consist of a distinct zirconia phase as well as a distinct ZDDP phase (FIG. 22).

TABLE 1

Surface parameters of the samples used in Example 1.

| | Liner (slide-honed) 10 × 0.55 | Liner (slide-honed) 50 × 1.0 | PVD CrN Ring 10 × 0.55 | PVD CrN Ring 50 × 1.0 |
|---|---|---|---|---|
| Sa (μm) | 0.662 | 0.175 | 0.822 | 0.208 |
| Sq (μm) | 0.936 | 0.224 | 1.451 | 0.268 |
| Ssk (—) | −2.132 | −0.655 | −0.991 | 0.77 |
| Sku (—) | 10.238 | 4.867 | 41.51 | 20.88 |
| Sp (μm) | 2.951 | 1.363 | 36.524 | 10.297 |
| Sv (μm) | −10.932 | −1.869 | −33.041 | −3.407 |
| Sz (μm) | 13.883 | 3.231 | 69.565 | 13.703 |

TABLE 2

Exemplary Modulus and Hardness
Measurement Results of the Tribofilm

| Surface | Modulus (GPa) | Hardness (GPa) |
|---------|---------------|----------------|
| Tribofilm | 148.40 | 7.04 |
| 52100 steel | 216.83 | 11.48 |

The contents of all references referred to herein are incorporated in their entirety in this disclosure.

We claim:

1. A method of forming a solid film on a lubricated surface comprising the steps of:
   (i) providing a lubricant comprised of a dispersion of capped metal oxide nanocrystals, wherein the nanocrystals are capped with a surface capping agent;
   (ii) introducing the lubricant in a contact region defined by two surfaces in proximity, and
   (iii) forming the solid film in the contact region defined by the two surfaces in proximity by sliding and/or rolling the two surfaces in proximity so as to produce pressure and/or shear stress on the lubricated surface sufficient to remove the capping agent from the metal oxide nanocrystals and thereby cause metal oxide nanocrystals to bind with each other and to at least one of the two surfaces in proximity to form a solid film of bound metal oxide nanocrystals in the contact region which is adhered to the at least one of the two surfaces in proximity.

2. The method of claim 1, wherein the solid film persists after formation in the absence of the sliding and/or rolling according to step (iii).

3. The method of claim 1, wherein the pressure is in a range of 100 MPa to 5 GPa.

4. The method of claim 1, wherein the shear stress is in a range of 10 MPa 0.5 GPa.

5. The method of claim 1, wherein the capped nanocrystals are present in the lubricant in an amount of 0.01 to 2 percent by weight of the lubricant.

6. The method of claim 1, wherein the temperature in the contact region during the sliding and/or rolling according to step (iii) is in a range of −100° C. to 200° C.

7. The method of claim 1, wherein the lubricant further comprises a zinc dialkyldithiophosphate (ZDDP) additive.

8. The method of claim 1, wherein at least one of the two surfaces comprises a steel composition.

9. The method of claim 8, wherein each of the two surfaces comprises a steel composition.

10. The method of claim 1, wherein the solid film has a hardness of 1 to 20 GPa.

11. The method of claim 1, wherein the solid film has a Young's modulus of 50 to 300 GPa.

12. The method of claim 1, wherein step (iii) is practiced so as to form the solid film to an average thickness of 30 nm to 500 nm.

13. The method of claim 1, wherein step (iii) is practiced so as to induce a shear rate on the lubricant in a range of $10^2$ to $10^7$ sec$^{-1}$.

14. The method of claim 1, wherein step (iii) is practiced to form a solid film in the contract region selected from the group consisting of an elasto-hydrodynamic lubricant (EHL) film, a boundary lubricant film and a hydrodynamic lubricant film.

15. The method of claim 1, wherein the lubricant is an oil or a grease.

16. The method of claim 1, wherein the lubricant is a synthetic, mineral or a natural lubricant.

17. The method of claim 1, wherein the lubricant comprises at least one component selected from the group consisting of a synthetic hydrocarbon, an ester, a silicone, a polyglycol and ionic liquid.

18. The method of claim 1, wherein the lubricant is an oil having a viscosity in the range of 2 to 1000 mPAs (cP) at a temperature of 100° C.

19. The method of claim 1, wherein the dispersion comprises zirconia nanocrystals capped with at least one surface capping agent.

* * * * *